United States Patent [19]

Leach et al.

[11] 4,114,893
[45] Sep. 19, 1978

[54] GRAMOPHONE EQUIPMENT

[75] Inventors: Leslie Alan Leach, Newton of Falkland; Henry Jamieson Riddoch, Leslie; Neil David Duffy, Glenrothes, all of Scotland

[73] Assignee: Pico Electronics Limited, Scotland

[21] Appl. No.: 670,421

[22] Filed: Mar. 25, 1976

[30] Foreign Application Priority Data

Mar. 27, 1975 [GB] United Kingdom ............... 13084/75

[51] Int. Cl.² .............................................. G11B 3/06
[52] U.S. Cl. .................................................. 274/9 RA
[58] Field of Search ............... 274/9 RA, 15 R, 13 R, 274/10 R; 179/100.4 D

[56] References Cited

U.S. PATENT DOCUMENTS

| 3,174,754 | 3/1965 | Puls | 274/15 R |
| 3,499,652 | 3/1970 | Holl | 274/15 R |
| 3,599,988 | 8/1971 | Norris | 274/15 R |
| 3,854,730 | 12/1974 | Takizawa | 274/15 R |
| 3,937,903 | 2/1976 | Osann | 274/15 R |

*Primary Examiner*—Harry N. Haroian
*Attorney, Agent, or Firm*—Morris Liss; Israel Gopstein

[57] ABSTRACT

Gramophone equipment incorporating photoelectric scanning to detect bands between record tracks; an electronic counter to count the detected bands; a selector for making track selections; an electronic memory for storing selections; control circuitry for comparing the contents of the counter and memory to control a tone arm of the equipment to play selected tracks and lift from a record at the end of a selection; and a tone arm drive comprising means for lifting and lowering the arm and means for driving the arm laterally under control of the control circuitry.

52 Claims, 32 Drawing Figures

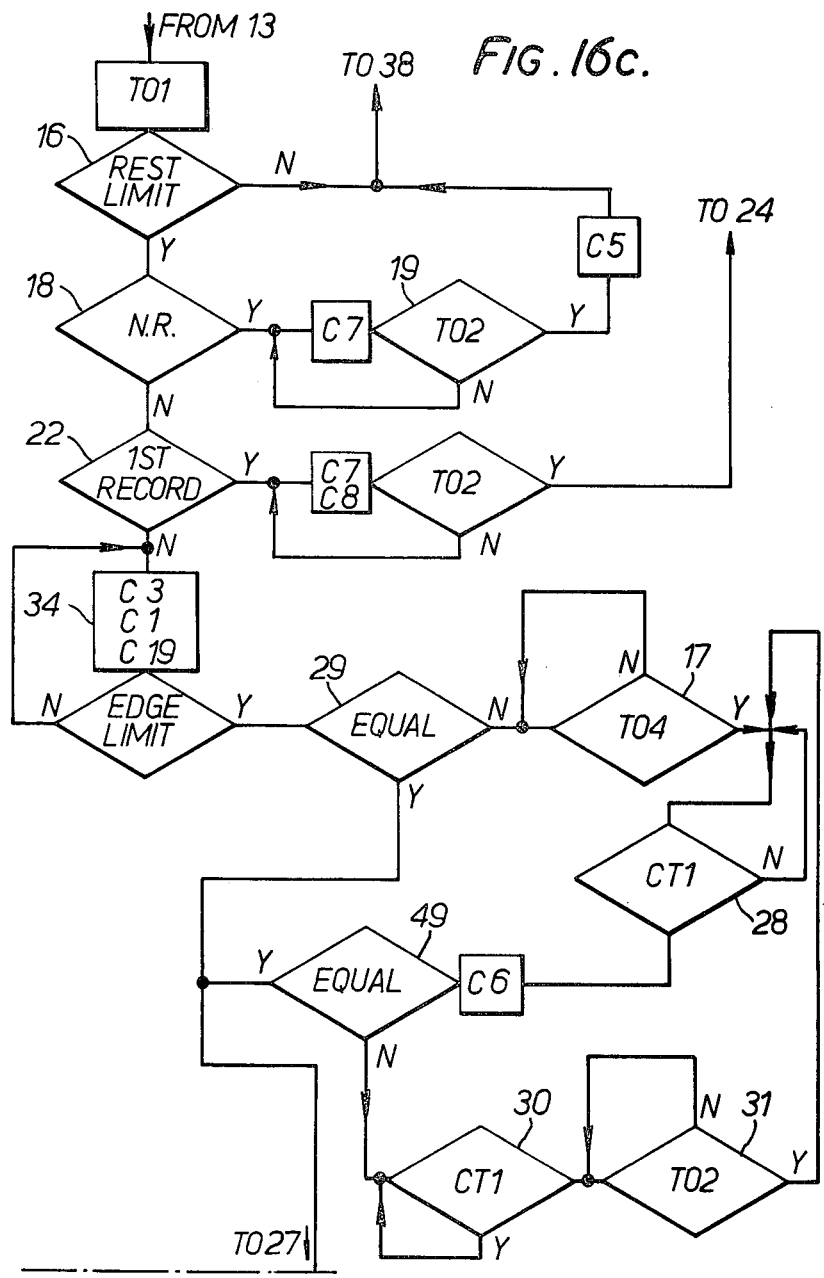

GRAMOPHONE EQUIPMENT

BACKGROUND OF THE INVENTION

This invention relates to gramophone equipment and particularly concerns tone arm control in gramophone equipment.

Tone arm control is disclosed in Stimler U.S. Pat. No. 2,952,464 and further details are disclosed in Nakagiri et al U.S. Pat. No. 3,368,080.

Stimler and Nakagiri et al propose the use of photoelectric scanning to sense record reflectivity and hence the number of bands of low groove density (i.e. of relatively high reflectivity). Stimler proposes that the signal from the scanning means be processed by using the signal to step a uniselector the steps of which are connected to the contacts of a multiposition switch operable manually to make a selection, this switch constituting a store for the selection. However, this solution is disadvantageous commercially because only a single selection can be made, because a manual rejection operation must be made to discontinue playing at the end of a track and make a new selection, and because this electromechanical solution takes up a significant amount of space and might tend to increase the size of gramophone equipment. Nakagiri et al is concerned merely with attempting to overcome optical problems inherent in Stimler and arising because of the varied nature of records currently on the market.

SUMMARY OF THE INVENTION

According to one aspect of the invention, there is provided gramophone equipment comprising a turntable, a movable tone arm for supporting a gramophone pick-up, drive means for the turntable and for displacing the tone arm to convey a pick-up across the turntable and towards and away from the turntable, and control means for controlling the drive means in dependence upon the reflectivity of a gramophone record of the kind having recorded tracks with a relatively high groove density and bands with a relatively low groove density between, preceding and following said tracks, the control means comprising photoelectric scanning means movable across the turntable for scanning such a record when on said turntable to produce a signal dependent on the reflectivity of the scanned portions of such a record so that this signal comprises signal portions indicative of respective ones of said bands, an electronic counter for counting said signal portions, selector means manually operable to define a track selection, electronic memory means coupled to the selector means to store a track selection defined by the selector means, and control circuitry including comparator means for comparing the stored selection with the number, as stored in said counter, of said signal portions occurring during scanning of the gramophone record and for producing a control signal for said drive means in dependence upon the comparison to cause the tone arm to move its pick-up onto the band immediately preceding a track defined by the stored track selection.

According to the first aspect of the invention, it is proposed to use electronic memory means to store a selection and an electronic counter to store the number of bands scanned. This enables one to implement the equipment in practice in a more compact manner and provides a possibility for improvement in other directions by means of electrical control. Thus, in a preferred embodiment, said circuitry is responsive to a signal portion indicative of the band immediately following a selected track to operate the drive means in a mode to move the tone arm away from the turntable, thereby to disengage from a record at the end of playing of a selected track and thus avoid the manual operation of any rejection actuator.

In addition it will be seen that the memory means, being electronic, may conveniently comprise a plurality of storage locations which can be used for storing a sequence of track selections defined by the selector means, said control circuitry then including means for operating the drive means under the control of the scanning means to move the tone arm to produce the stored sequence of selections. In that case, the circuitry preferably also comprises means for inhibiting the aforesaid motor mode which lifts the tone arm when the next track defined by said memory means is the track immediately following said selected track. It will also be realised that the electronic memory enables a random selection to be made on the or each record.

The use of an electronic memory also enables a commercially acceptable extension of the invention to be made to record changers. Thus, one embodiment of the invention comprises a record changing mechanism coupled to said drive means, the selector means having provision for entering record selections in addition to track selections, the memory means having storage locations for entered record selections and the drive means being operable in response to a stored record selection to provide a mechanical movement to actuate said record changing mechanism.

Conventional record changing mechanisms operate such that the turntable is rotating during record changing. On the other hand with this invention, it becomes possible to include means to control the drive means of the turntable to prevent turntable rotation during operation of the record changing mechanism.

It is clearly a convenient solution to have the scanning means carried by the tone arm as in Stimler, but when scanning occurs not only with the tone arm raised, as when looking for a selected track, but also when the tone arm is down, as when looking for the end of a track being played, it needs to be recognised that the speed of scanning, and therefore the nature of the resulting signal, varies considerably between the two arm positions, unless one has a possibly unacceptable slow speed of scanning in the up position. In particular we have discovered that, when the tone arm is down and its speed is dictated by the pitch of the grooves and the speed of turntable rotation, the rate of change of the signal is relatively slow on entering a band and may not be clearly distinguished, particularly at the edge of a band, from a signal change due, for example, to groove modulation changes. Indeed, the signal produced in practice is relatively noisy for a variety of reasons. Thus, in one embodiment, the control means comprises a processing circuit for the signal of the scanning means, the processing circuit comprising filtering means adapted for a greater response to signal changes at the rates occurring on scanning into a band when the tone arm is travelling with the pick-up engaging a record than to signal changes at a higher rate. Preferably the filtering means has less response also to changes at lower rates and may therefore be in the nature of a band pass filter. The filtering means may be designed for relatively low scanning rates, when there are preferably means responsive to tone arm vertical position to render said filtering means ineffective in said control means when said tone arm is in a raised position in which the scanning means scans across the turntable without pick-up engagement of a record. When in the raised position, an alternative processing characteristic may be provided which is adapted to the nature of the signal occurring when the arm scans in its raised position.

The processing means may comprise two channels the inputs of which are coupled to receive the signal of the scanning means, a first of which channels comprises the filtering means and the output of which is used by the control means when the tone arm is in a lowered position and the output of the second channel being used when the tone arm is in its upper position. Alternatively there may be a single channel with switching means to change the characteristics of the channel in dependence upon tone arm position in the vertical sense.

Stimler registers the presence of a band in dependence upon the level of the signal reaching a given magnitude. However this does not by itself reliably define precisely where a band is because the flanks of the signal can be affected by factors other than the edge of a band, e.g. exhibit an early relatively large shoulder because of groove modulation change near the end of a track as might occur with a loud climax to a record. Nakagiri et al to a limited extent compensates for this by using two photodetector elements spaced apart in the scanning means and by creating an indicative signal from the outputs of the elements in combination. This is effective, however, only for a limited width of band. According to one embodiment of the present invention, it is proposed instead to analyse the signal from the scanning means approximately to identify the position of the peaks of the signals, these peaks occurring normally in the central regions of the bands.

Thus, in general terms, the control means may comprise analysing circuit means for analysing said signal portions to produce therefrom peak signals in response to peaks of the signal of the scanning means, the control means being arranged to utilise said peak signals as indicative of the bands. In particular the control means may be arranged to utilise said peak signals as indicative of bands when the tone arm is in a lower position in which the scanning means scans across the turntable with pick-up engagement of a record. It is also possible to use the peak signals when the arm is raised, but in practice it may not be necessary. Differentiation may be used to produce said peak signals.

We have also appreciated that reliable band detection can be difficult when scanning with the tone arm in its raised position because of the relatively great distance then between the scanning means and the record and because this distance can be variable, e.g. because of a warped record or a variable height of stack when using a record changing facility. The relatively great distance also makes the equipment more sensitive to varying reflectivities between records.

It is therefore proposed to include a control circuit for controlling the response of the scanning means in dependence upon the mean level of the signal produced by the scanning means. This may be achieved by a controllable amplifier through which the signal of the scanning means passes. Alternatively, and when the scanning means comprises a light emitting device for emitting light onto a record during scanning, the control circuit may be coupled to the light emitting device to control its emission in dependence upon said mean level. As this control is particularly applicable when the tone arm is up and may not be advisable due to the normal slow rates of change when the arm is down, the equipment may comprise means responsive to tone arm position to render the control circuit operative only when the tone arm is in the raised position.

For the same reasons it is also preferable that the spacing between said devices should be small in comparison with the distance between the devices and the turntable.

As opposed to the teaching of Stimler and Nakagiri et al, we have also appreciated that the emission axis of the light source device and the reception axis of the light responsive device are preferably substantially parallel. Preferably also, the light responsive device is mounted in a tube with the axis of the tube substantially at right angles to the surface of the turntable and the light emitting device may have a focussing lens. Utilizing these features assists in ensuring that the responsive device is illuminated substantially over its whole area even when the arm is down.

Preferably, the scanning means are adjustably carried by the tone arm so as at any instant to scan a record portion adjustably in advance of the record engagement point.

By scanning sufficiently ahead of the engagement point, it can be ensured that, if the tone arm is stopped on detecting a band, inherent delays and the momentum of the arm will not be sufficient to allow the arm to go beyond the band concerned. As will be discussed hereinafter, we have also appreciated that a brake can advantageously be used to absorb the momentum of the arm. The amount by which the scanning means looks ahead is adjustable so that the equipment can be set to give the required performance after manufacture.

Another problem which has not been solved by Stimler or Nakagiri et al is caused by the eccentricity of the centre hole of a record, whereby a given band has a variable radius. Thus the position of the band detected at one radius may not equal the band radius at the point at which the stylus is set down, bearing in mind that the turntable should be rotating at stylus engagement. One solution is to scan the record when stationary and to minimise the time between the start of turntable rotation and stylus engagement, so that the band region detected is as close as possible to the band region engaged.

However, in a preferred solution, the control means comprises timing means for delaying dropping of the tone arm when the band immediately preceding a selected track is sensed, the delay approximating an integral number of revolutions of the turntable less the time for said arm to drop so that the stylus engagement point is close to the band region detected.

If a rapid start turntable motor is used, scanning of a record with the tone arm in a raised position not engaging a record can be effected with the turntable stationary, also to avoid the effect of eccentricity on the signal of the scanning means.

As already indicated, there are preferably brake means for acting on the tone arm when in a raised position and substantially to prevent tone arm momentum from moving the tone arm radially inwardly of its required position to select a track. It is believed that such brake means are not conventionally part of gramophone equipment. An advantageous way of using the brake means is to couple it to act on the tone arm throughout the movement of the arm across the turntable and to disengage the brake means from the tone arm only when the tone arm has stopped.

To achieve improved audio performance, there are preferably means for maintaining the tone arm completely disengaged from the drive means during playing of a record and also from the brake means if provided.

Coming now to the electronic portion of the equipment, it is proposed to provide a "PLAY" actuator to initiate record playing, the control means comprising logic means responsive to said actuator so that record playing can be initiated by actuation of the actuator and selector means in either order. This may be achieved by a store to store the occurrence of operation of the "PLAY" actuator, the logic means being coupled to read said store. The user can therefore, at his option, select tracks by an operation such as "PLAY" then tracks '3' etc. or such as tracks '3' etc. and "PLAY". Preferably, the control means also allows additional selections to be made during playing of a previous selection.

The equipment may have visual display means for displaying each selection when entered by the selector means and for also displaying each selection as it is played. In the case of a record changer the display means can also be operable to display a record number when selected and also when that record is playing. Thus, the display means can be coupled to read the memory means during selection by the selector means, and to read the track number counter during record playing.

In a record changer, there may also be a record counter for counting record changes, the display means being coupled to read the record counter during record playing.

To determine the sequence of operations of the equipment the control means may comprise a store having a plurality of addresses defining respective operating steps of the equipment and test logic controlled by the store to determine the sequence in which the addresses are read. This store may be a random access memory.

It is also found that other problems can arise in tone arm control, particularly in lifting the arm at a record centre, conventionally dealt with by cumbersome mechanical means, and in lowering the arm onto the first, edge, band, also conventionally dealt with by mechanical means. With this in mind we have developed gramophone equipment, according to another aspect of the invention, comprising a turntable, a tone arm, drive means for the turntable and for the tone arm, photoelectric scanning means for scanning a gramophone record when on the turntable to produce a signal indicative of any of the bands preceding and following the recorded tracks of such record, signal generator means coupled to the tone arm for producing a signal indicative of when the tone arm is in a given position, and electronic logic means for controlling the operation of the drive means for the tone arm in dependence upon both the signal of the scanning means and the signal of the signal generator to control engagement of the tone arm with a record in dependence upon the combination of the sensing of a band and the sensing of said position.

It would appear that the signal of the scanning means itself would be adequate in defining the record edge and centre and thus by itself initiate tone arm drop and lift. However, this is not so if the equipment is to operate satisfactorily under various conditions and with a variety of record types.

With regard to the record edge, this is normally curved and often not regularly formed during record manufacture, so that reflections may occur from this edge at various angles and be detected as a band before the arm has reached the record. Also there may be spurious reflections from portions of the equipment surrounding the turntable.

Accordingly, in a preferred embodiment, the signal generator is responsive to tone arm position to provide an edge signal defining when the tone arm has passed a position corresponding to the edge of a record of given size, the logic means being responsive to the edge signal to prevent any signal portions occurring before the edge signal from being included in said number of said signal portions. In this way spurious signals can be blanked. An edge signal can be given at a variety of positions, e.g. as appropriate for 12 inch, 10 inch and 7 inch records.

With regard to the record centre, preferably the signal generator is responsive to tone arm position to provide a centre limit signal on sensing a tone arm position at a given radial distance from the axis of the turntable in a central region of the turntable, the logic means being responsive to the centre limit signal, and preferably also the signal from the scanning means, to operate the drive means to lift the tone arm away from a record. Thus the centre limit signal may correspond to a required lift position for 33 r.p.m. records, but 45 r.p.m. records may have recorded track slightly beyond that position. By waiting for a signal portion indicative of a band, the equipment is prevented from disengaging the stylus until a track extending beyond the limit has finished.

The signal generator may also be designed to produce a signal defining a rest position of the arm.

All of these features of the second aspect of the invention can advantageously be provided in equipment according to the first aspect.

It is also proposed to provide for electro-mechanical control of a tone arm by providing, according to a third aspect of the invention, equipment for controlling a gramophone tone arm comprising: a reversible motor; a cam, having a ramp portion, coupled to be driven by the motor; a tone arm drive shaft; a releasable clutch for selectively coupling the cam and the drive shaft; and a tone arm control member mounted to engage said cam ramp portion to cause lifting and lowering of the tone arm as said member rides up and down the ramp portion.

There may be at least one light responsive element, together with a light deflecting means carried by the tone arm drive shaft to deflect light to the responsive element in predetermined angular positions of the drive shaft. Thus at least one responsive element can, accordingly, provide the signal generator mentioned hereinbefore. The or each responsive element, or the deflecting means, is preferably adjustably positioned for adjusting said angular positions.

The equipment may include switches controlled by the cam to define predetermined cam positions, and thus to define tone arm and motor conditions. The aforementioned brake means can conveniently be associated with the tone arm drive shaft as a displaceable brake member frictionally coupled to the drive shaft, the cam having a portion to hold the brake member out of its coupling with the drive shaft in an angular position of the cam in which the control member is in its lowermost position in relation to the cam. Thus, the cam may be formed to commence to displace the brake member when the control member is on the ramp portion.

Such equipment according to the third aspect may also comprise a member displaceable for the purpose of actuating a record changing mechanism, the cam having a portion to engage said member to cause its displacement when the cam is moving in a given direction at a given angular position at which the control member is in its raised position.

Whilst the scanning means is preferably carried by the by the tone arm, it is alternatively possible for the scanning means to have its own drive arrangement coupled to the drive means for movement of the scanning means independently of the tone arm. The drive arrangement may have a releasable coupling with the tone arm so that the tone arm can be moved with the scanning means.

BRIEF DESCRIPTION OF THE DRAWINGS

For a better understanding of the invention and to show how the same may be carried into effect, reference will now be made, by way of example, to the accompanying drawings, in which:

FIGS. 16a–16d is a flow chart;

DETAILED DESCRIPTION OF THE FIGURES

Figure 1:
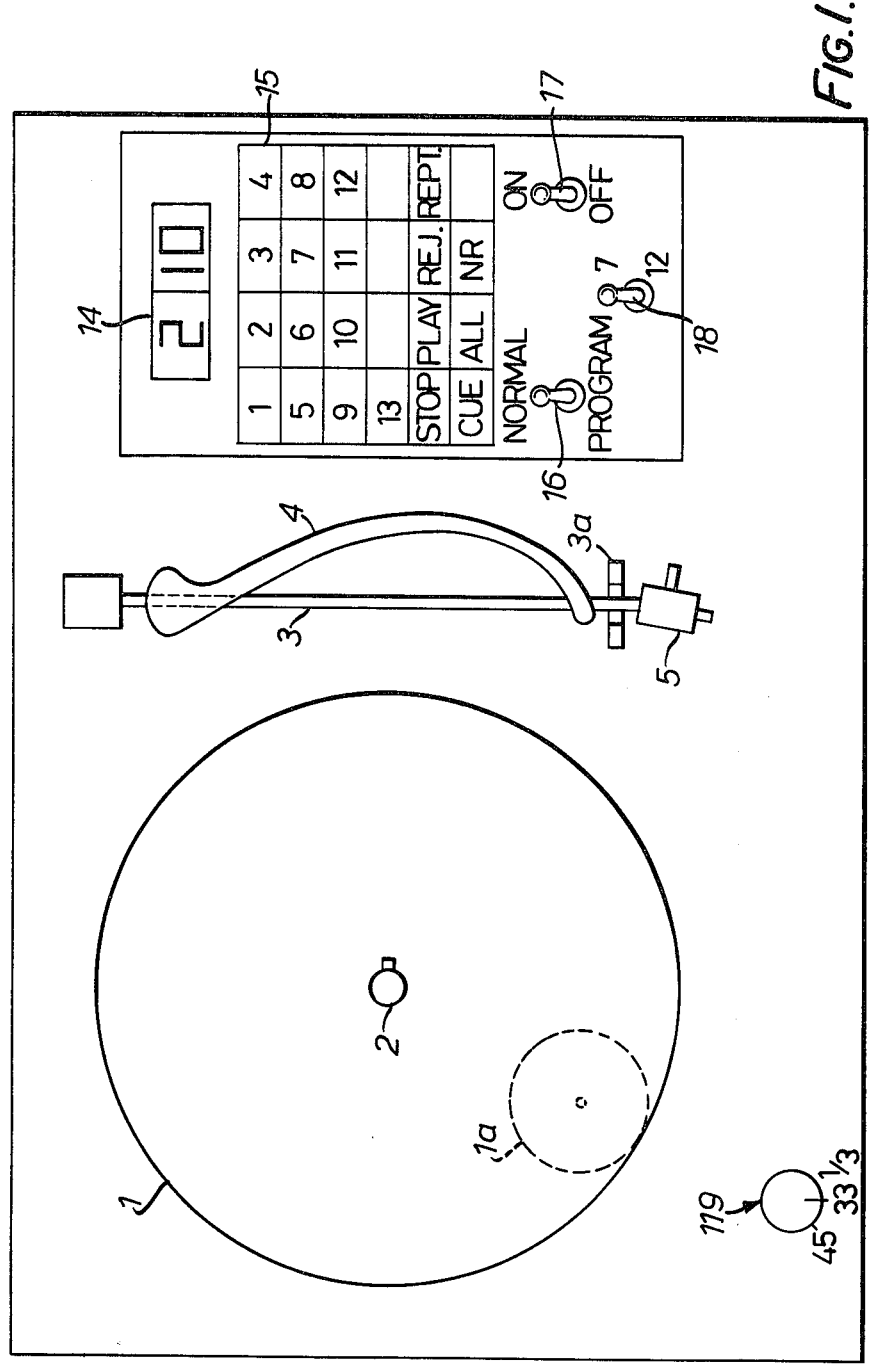
FIG. 1 is a plan view of record changing gramophone equipment for playing records, with provision for selecting tracks on the records and for selecting records.

FIG. 1 is a plan view of record changer gramophone equipment comprising a conventional turntable 1, record-changing centre spindle 2, tone arm 3 with rest 3a, over-arm 4 and turntable drive motor 1a. Also provided is a pick-up 5 of conventional construction except for features to be described in relation to FIGS. 2 and 3.

The record changer equipment also has a control panel comprising a display 14, a keyboard 15, a mode switch 16, an on-off switch 17, a record size (7 inch/12 inch) switch 18 and a speed selector switch 119.

The display 14 can display two numbers, the second one being of up to two digits. In the following, display examples will be represented in the form "$x,y$" where $x$ and $y$ are the two numbers.

Figure 2:
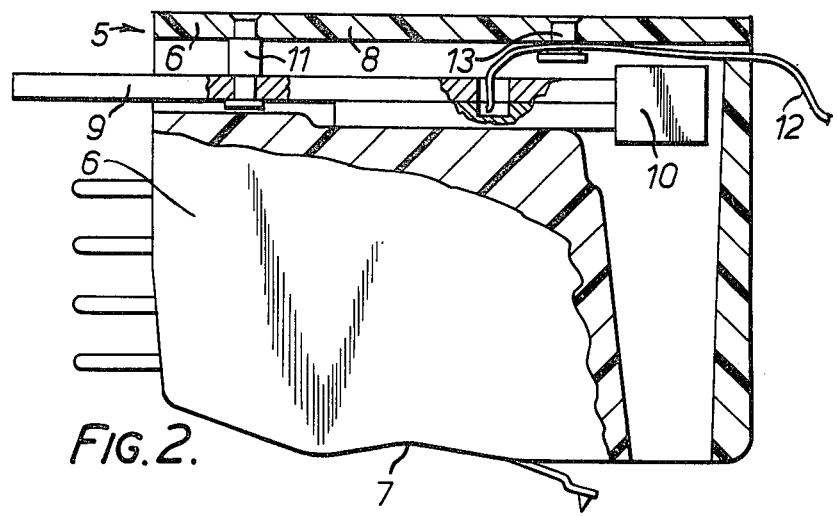
FIG. 2 is a partial cross-sectional view of a pick-up cartridge of the equipment of FIG. 1.

FIG. 2 is a cut-away view of the pick-up cartridge 5 having a housing 6 containing a conventional transducer 7 in which a stylus is lodged. Located between the upper wall 8 of the housing and the transducer 7 is a printed circuit strip 9 carrying a photoelectric scanning assembly 10 at one end and at its other end being connected to leads which will pass, with the leads from the transducer 7, through the arm 3. The scanning assembly 10 is designed to scan a record as the tone arm moves across the turntable and this feature will be described in more detail hereinafter. In general terms, the scanning assembly is looking for regions of high reflectivity corresponding to the bands preceding, between and following recorded tracks.

The strip 9 and the assembly 10 are pivotally mounted at 11 to the wall 8. An arm 12 is pivotally mounted at 13 to the wall 8 and an end of the arm engages in a recess in the strip 9. The arm can thus be adjusted to displace the scanning assembly laterally so as to set the assembly to scan an adjustable distance ahead of the stylus position of the cartridge. The adjustment is desirable in practice to allow for variations in stylus position relative to the tone arm, e.g. on change in stylus or on stylus deformation due to rough usage.

Figure 3:
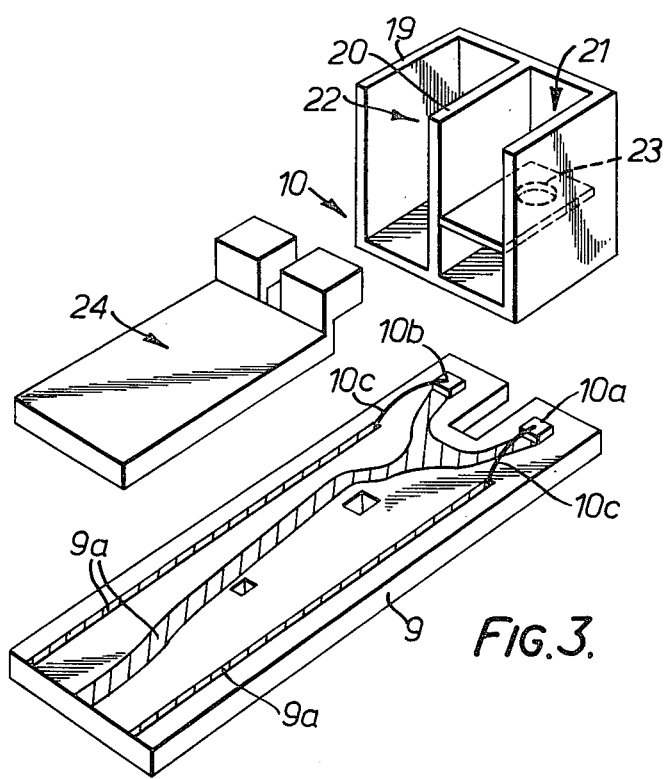
FIG. 3 is an exploded view of a scanning assembly of the cartridge of FIG. 2.

FIG. 3 is an exploded view from below of the scanning assembly 10 and the strip 9. The strip 9 carries three printed conductors 9a, the centre one of which is bifurcated and has bonded to it a light-emitting diode 10a and a photodetector 10b connected to respective ones of the outer two conductors 9a by leads 10c. The assembly also includes an opaque, plastics-moulded, shroud 19 to contain the devices 10a and 10b and provide a barrier 20 for direct light transmission between them. The shroud and an insert 24 define two parallel, square-section, passages 21 and 22 for the passage of light to and from the devices 10a and 10b substantially at right angles to the turntable surface. Passage 21 accommodates a hemispherical lens 23 for the diode 10a, the distance between lens and diode being approximately $1.2 \times D$, where D is the diameter of the lens.

The length of the passage 22 from the device 10b is from about 3/32 to 5/32 inches, the length of passage 21 from the lens is about 1/16 inches and the width of the passages is between 1/16 and 1/12 inches. The spacing of the devices 10a and 10b is about 3/32 centre to centre, which latter distance is small in relation to the separation between either device and the turntable. The dimensions are chosen to ensure that, even when the tone arm is in its lowermost position with its stylus on a record, the light from the diode and reflected by the record illuminates substantially the whole of the sensitive area of the photodetector 10b. This arrangement minimises focusing problems that exhibit themselves when scanning from various heights with an optical axis not substantially at right angles to the turntable surface.

The signals from the photodetector 10b are passed to logic circuitry which controls a mechanism which governs the movements of the tone arm. With appropriate logic circuitry, the operation of such a record changer will be, for example, as now described in general terms.

On switching on, if the arm is at its rest position, no action will occur, otherwise the arm will be automatically returned to its rest 3a.

It will now be assumed that the mode switch 16 is in its "normal" position and that records are stacked on the centre spindle with the overarm in position on the stack.

The button "PLAY" is depressed to cause the first record to drop and the display will read "1,1" to show the first record and the first track. At the end of each track (sensed by use of devices 10a and 10b) the display will change accordingly, e.g. at the end of track 1, the display will change to "1,2".

At the end of the record the arm will lift and the display will change to "2, ". When the arm returns to rest, the second record will drop, and the arm will go to the edge of the record and the display will read "2,1".

To reject the record the "STOP" button is depressed followed by the "PLAY" button. The arm will return to rest and the third record will drop and the display will read "1,1", thereby in effect starting a new cycle in which the third record is now called the first.

To reject a track the "REJ" button is pressed and the second number of the display will advance by one. The arm returns to rest and then back to the next track.

The cycle will stop after the last record has been played; to stop the cycle prematurely the "STOP" button is pressed.

To operate as a programmed record changer, the mode switch 16 should be in the "program" position. It is then necessary to select required tracks.

Suppose that tracks 2 and 3 on record 1 and tracks 4, 7 and 5 on record 2 are required in that order. Button "2" is pressed to select record 1 track 2 and the display reads "1,2". Then button "3" is pressed to select record 1 track 3 and the display reads "1,3". The button "NR" selects record 2 and the display reads "2, ". Button "4" selects record 2 track 4, the display going to "2,4", then button "7" and finally button "5", give a display of "2,5".

On pressing the "PLAY" button, the display changes to "1,2", the first record drops and the arm moves in to select track 2. At the end of track 2 the arm stays down on the record to play track 3. The display changes to "1,3".

If desired, further selections can be made while the equipment is playing. The display will show the selections entered. The "PLAY" button has to be repressed to return the display to the selection currently being played.

To reject this track the "REJ" button is pressed and the display changes to "2,".

The arm will return to rest, a record will drop and track 4 will be selected, this being the next selection. The display changes to "2,4". After playing record 2, tracks 4, 7 and 5, the arm will return to rest and stop. The display will cancel.

The equipment can be operated as a single player in a similar way to its operation as a programmed changer. The record can be put on the turntable and the overarm in the off record position. There is no need to use the "NR" button. If all tracks are required, the "ALL" button is used.

The "ALL" button is used to select all tracks of any particular record when the machine is used in the programmed mode. Thus, if the user wants record 1 track 3 followed by all tracks of record 2, button 3 is pressed, then "NR", "ALL" and "PLAY".

Record 1 track 3 will be played first followed by record 2 tracks 1, 2, 3 etc.

If using the machine in a single play mode, one can press "ALL" then "PLAY", and all tracks of the record will be played. Single tracks can be rejected as previously described.

The "STOP" button functions to clear the entire program and return the arm to the rest position.

If a track selection has been made which is greater than the number of tracks on the record, the arm will reach the central record region and return to the rest; the machine will then attempt to play the next selection. If necessary the sequence will be repeated until there are no more selections. The same thing will happen if there is no record on the turntable.

In the normal mode, if there is no record on the turntable, the arm will go to the central region, return to the rest and stop.

The turntable could be arranged to start to rotate when the arm starts to drop on the selected track and stop when the arm lifts, the turntable being stationary when a record drops. However, in the embodiment to be described in more detail hereinafter, the turntable commences to rotate when the equipment is switched on and stops only during record change.

Pressing the "CUE" button with the tone arm in the up position causes the arm to lower without any sideways motion. Conversely, if the "CUE" button is pressed when the tone arm is in the down position the arm lifts.

The equipment functions as described as a result of the light-emitting diode 10a emitting light onto a record, the photodetector 10b receiving the reflected light and the resulting signal being processed to determine pick-up position.

The grooves within a track have low reflectivity and so produce a low level signal with a ripple corresponding to the speed at which the grooves are scanned. On the other hand the band or gap separating tracks has a high reflectivity and produces a high level signal. Thus, the signal of the photodetector conveys data defining the moments at which the bands or gaps are being scanned in that its amplitude will increase by a certain amount at these moments. The signal has properties which depend upon whether the tone arm is up or down. When the tone arm is up, a smaller proportion of the emitted light is returned to the photodetector than when the arm is down. Also, when the arm is up the scanning rate is higher so that the signal changes level on sensing a band or gap at a rate, e.g. 100 volts/sec., higher than that occurring with the arm down, e.g. 1 volt/sec.

Moreover, when the arm is up, the signal is particularly sensitive to warping of records and its intensity is also dependent on how many records are on the turntable.

Figure 4:
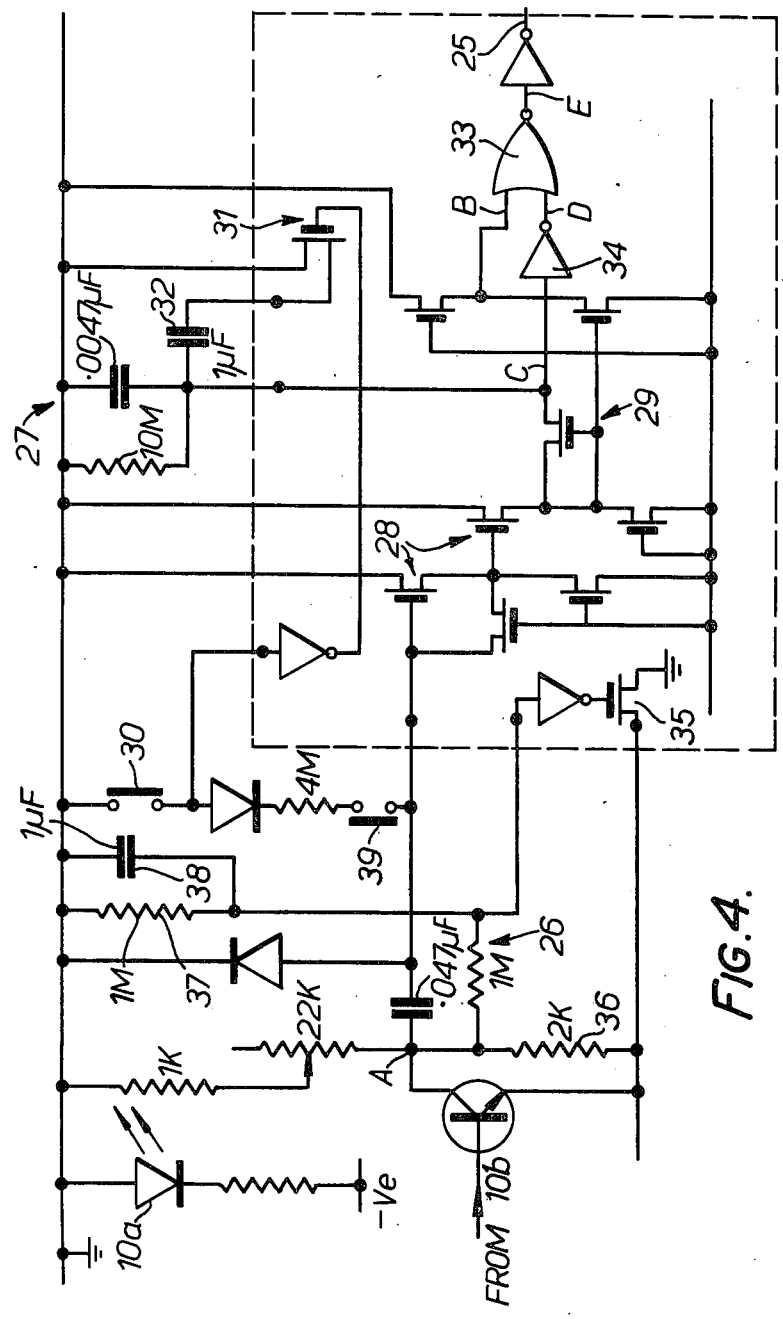
FIG. 4 is a circuit diagram of one embodiment of circuitry for processing the signal from the scanning assembly.

The signal is processed by a circuit, one example of which is shown in FIG. 4, to take these differences into account.

The signal produced as a result of light falling on the photodetector 10b is amplified by a transistor and fed to a processing channel at A. The channel includes circuit elements giving the channel different response times suited to the nature of the signal in its two conditions, the channel having a shorter response time when the arm is up than when it is down. The channel has an output 25.

Figure 5:
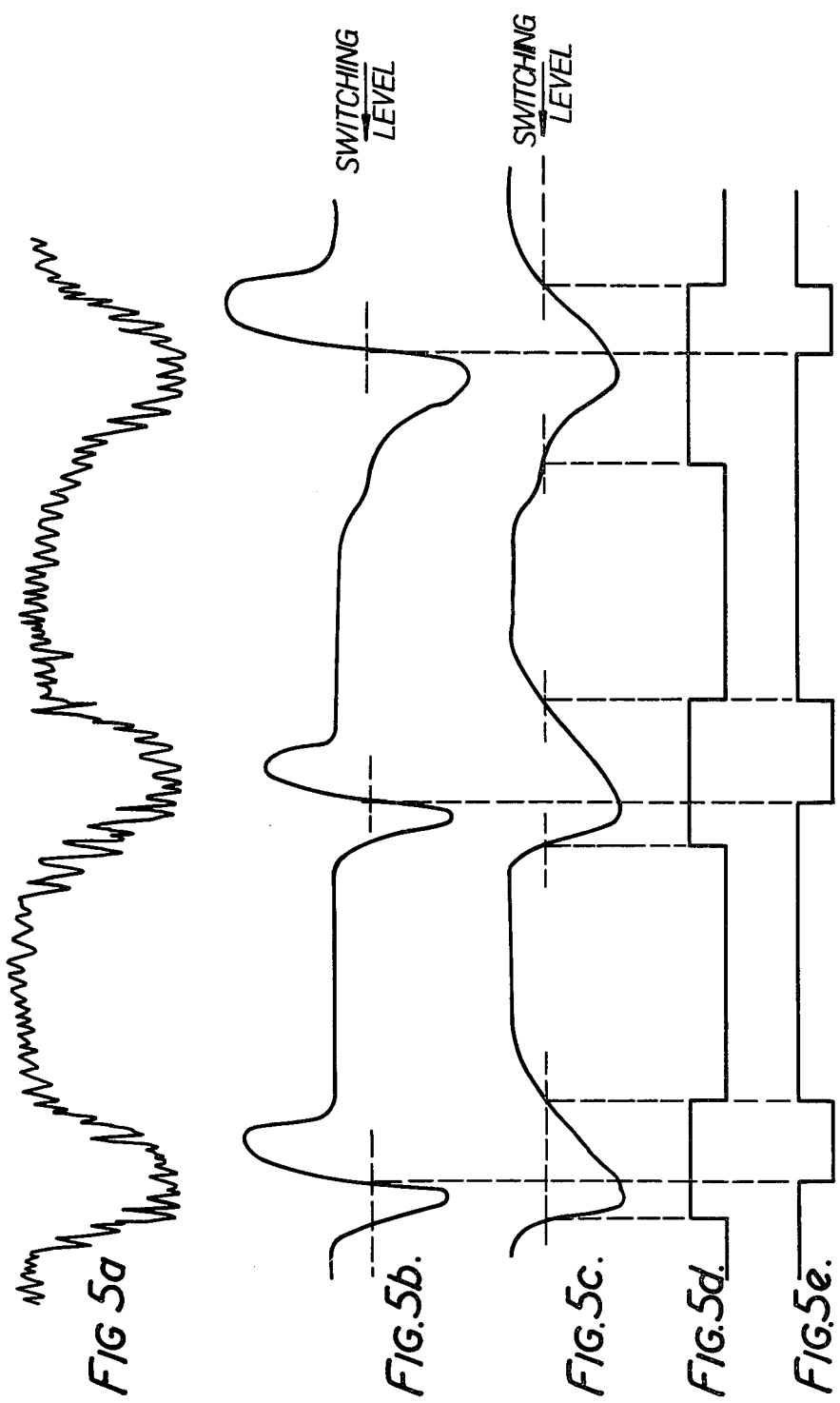
FIGS. 5a to 5e are waveforms of signals at points A to E of FIG. 4.

FIG. 5a illustrates a typical waveform at point A of the channel when the arm is down. The high frequency component shown in FIG. 5a diagrammatically as a regular ripple represents the noise typically found in the signal; the low frequency envelope of the signal comprises pulses caused by bands between tracks, the third pulse having a distinct shoulder caused for example by groove modulation such as is typically found on good quality records. Sometimes the groove modulation produces a low pulse separated from the main pulses, but in many instances such a pulse will merge with the main pulses, as groove modulation is common at the ends and beginnings of recorded tracks, to give shoulders to the flanks of the main pulses. The channel has resistive and capacitive elements to provide a high pass filter (differentiator) 26 and a low pass filter (lossy integrator 27), which together give a band pass action, and threshold elements 28. The low pass filter is designed to reduce the level of noise and the high pass filter is designed to reduce the amplitude of signals produced by groove modulation when, as is typical, they occur at a slower frequency than the main pulses. The thresholds in the circuitry are designed to reduce further the effect of the low amplitude signal portions produced by groove modulation.

When the arm is up, the characteristic of filter 27 is changed because a switch 30 operates to open element 31 to put capacitance 32 out of circuit.

The circuitry fed by output 25 may include a further threshold and also timing means to accept only one pulse from output 25 in a given time, e.g. a time corresponding to about 30 thousandths of an inch of travel of the arm when raised.

The channel also contains a peak detecting circuit 29 including a rectifier in the form of a diode pump.

The peak detecting circuit 29 includes signal paths feeding a NOR gate 33 and the effect of this circuit can be seen in FIGS. 5a to 5e showing diagrammatically the waveforms at points A, B, C, D and E.

FIG. 5a shows the waveform of a signal entering at A and, in this example, the third pulse of the waveform exhibits a shoulder produced by groove modulation. Mere level detection on such a pulse could cause the tone arm to lower before the beginning of a band and thus play the end of the track preceding the selected track. At point B (FIG. 5b) the noise of the signal is substantially eliminated, whilst the differentiating action approximately locates the peaks of the pulses of FIG. 5a. FIG. 5c shows the waveform after rectification and lossy integration, this signal then being processed by a digital inverter 34 which acts as a squarer (FIG. 5d). The signals at B and D are compared by the NOR gate 33 to produce pulses at E (FIG. 5e) approximately defining the peaks in FIG. 5a by having negative-going edges located in time at positions corresponding to the central regions of the bands being detected.

The circuit of FIG. 4 also shows a control feature designed to render the system relatively insensitive to variations which might otherwise be interpreted as being due to record bands. This control is effected by a controllable transistor 35 which acts as a variable resistance across resistor 36. The mean d.c. level of the signal of FIG. 5a is filtered out by elements 37 and 38 and controls transistor 35 to vary the energisation of the input transistor. This control is effective when the arm is up but has negligible effect when the arm is down as then the signal is relatively large and tends to drive the element 35 into saturation.

A switch 39 can be operated by the user to change the gain of the channel as may be necessary for certain records. It may be replaced by a potentiometer.

The switch 30, responsive to tone arm vertical position, is included so that the voltage at switch 30 is dependent upon tone arm position, being negative with the arm up and approaching OV when the arm is down.

The circuit of FIG. 4 and the keyboard are coupled to an integrated circuit which controls the turntable motor 1a and a tone arm motor, the latter motor driving the tone arm by a cam and clutch mechanism including an optical signal generator delivering signals in dependance upon tone arm angular position. In the described embodiment, the portion of FIG. 4 within dotted lines is included in the integrated circuit which is shown in block diagram form in FIGS. 14 and 15. The cam and clutch mechanism is shown in FIGS. 6 to 9 and will now be described.

Figure 6:
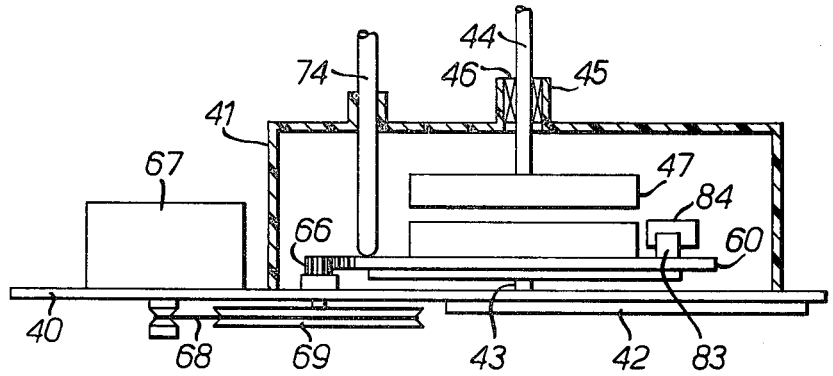
FIG. 6 is a diagrammatic cross-sectional view of a cam and clutch mechanism of the gramophone equipment.
Figure 7:
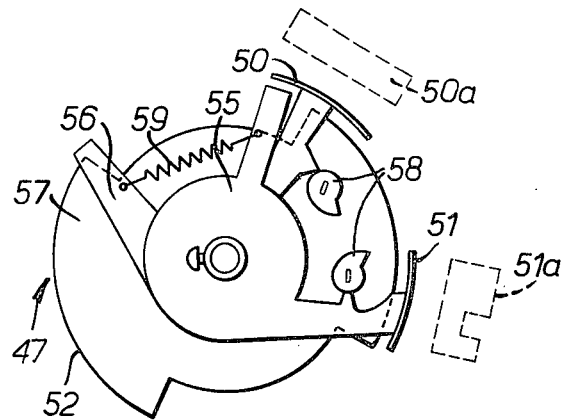
FIG. 7 is a plan view of a part of the mechanism of FIG. 6.
Figure 9:
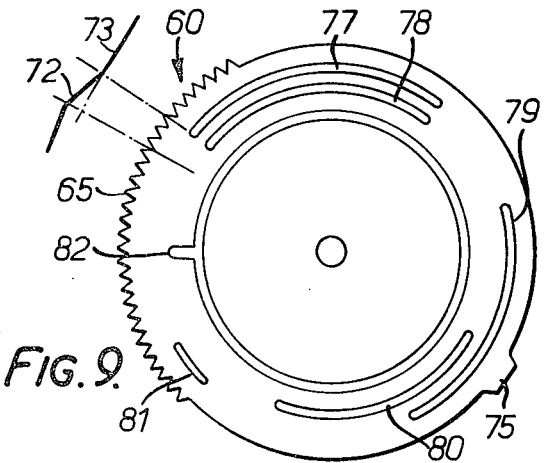
FIG. 9 is a view of the cam of the mechanism of FIG. 6.
Figure 8:
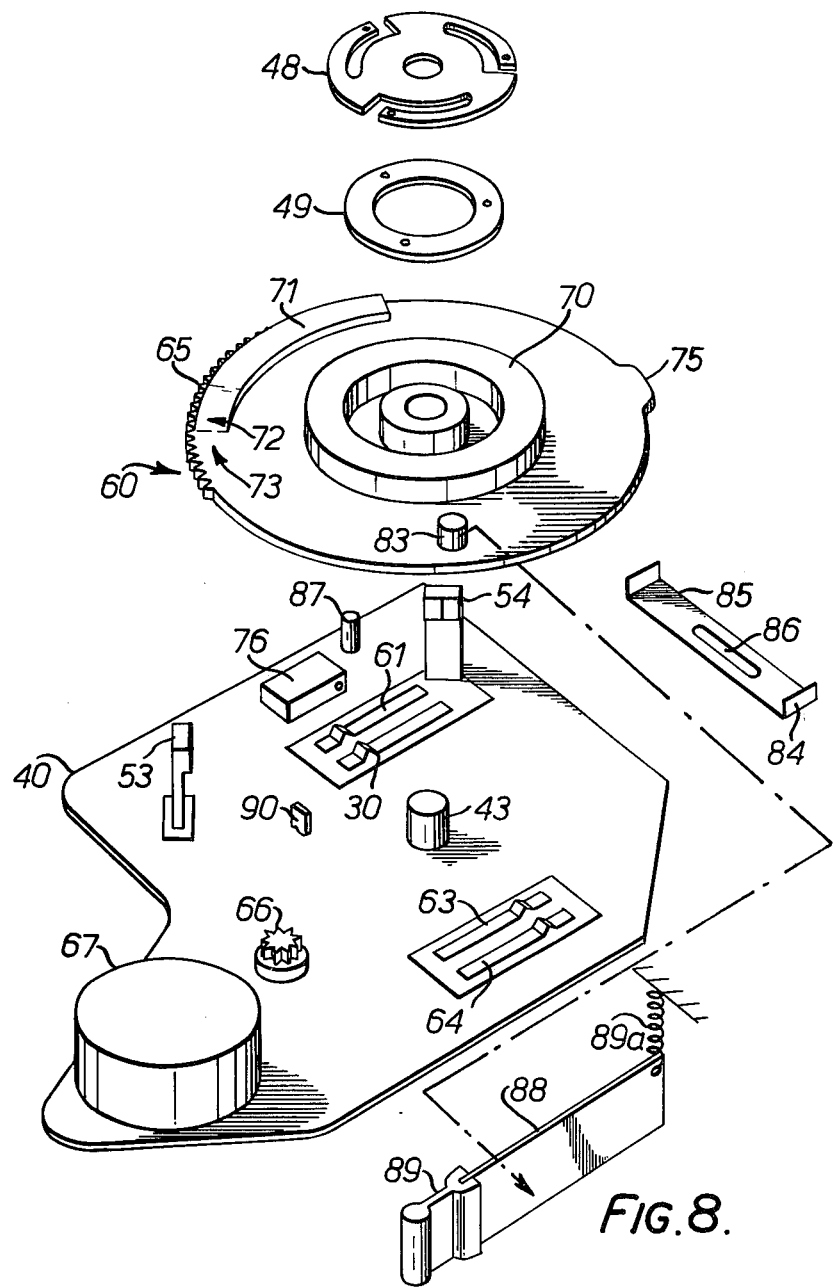
FIG. 8 is an exploded view of parts of the mechanism of FIG. 6.

FIG. 6 is a diagrammatic cross-section of a unit of the gramophone equipment including the cam and clutch mechanism, FIG. 7 is a plan view of a portion of FIG. 6, FIG. 8 is an exploded view of a portion of FIG. 6, and FIG. 9 is a view of the underside of the cam of the mechanism.

The unit shown in FIGS. 6 to 9 comprises a base plate 40 on which is mounted a plastics moulded housing 41 containing the mechanism. A printed circuit 42 is mounted below the base plate to convey signals to the integrated circuit from sensors (FIG. 8) in the housing 41.

The mechanism comprises two coaxial but independent shafts 43 and 44, the shaft 44 constituting a drive shaft on which the tone arm is mounted. The drive shaft 44 is mounted in a bushing 45 for rotation by means of a bearing 46. At its lower end, the shaft 44 carries an assembly 47 comprising, as shown in FIG. 7, a part of a tone arm position sensing arrangement and a resilient part 48 supporting an annular magnetic clutch part 49. As best seen in the exploded view of FIG. 8, the part 48 has a plurality of resilient spokes supporting an annular outer rim of the part, to which rim the clutch part 49 is riveted so that a limited axial movement is possible between the shaft 44 and the clutch part 49.

The assembly 47 carries (FIG. 7) two light reflective vanes 50 and 51 together with a brake vane 52 the purpose of which will be discussed hereinafter. The faces of the vanes are shown dotted in FIG. 7 at 50a and 51a, the latter containing a slot. The vanes 50 and 51 pass during the angular movement of the shaft 44 in the region of respective sensors 53 and 54 each having a light emitting diode and a photodetector. As shown in FIG. 8, each diode with its associated detector is mounted on a projection from the printed circuit 42, the projection extending through an aperture in the base plate 40. To enable the vanes to be adjusted relative to the sensors, the vanes are formed on arms of respective members 55 and 56 pivotally mounted on a base member 57 carrying vane 52 and secured to shaft 44. Snail cams 58 are rotatably engaged in the member 57 and the members 55 and 56 are urged against the cams by a spring 59.

The lower shaft 43 is secured against rotation to the base plate 40 and rotatably supports a cam 60 (FIGS. 6, 8 and 9) having a lower and an upper camming surface and also having a peripheral camming surface. The lower camming surface is designed to cooperate with flexible conductive contacts 61, 30, 63 and 64 which form four switches with conductive parts on the printed circuit board 42.

A portion 65 of the periphery of the cam 60 is provided with teeth to mesh with a gear 66 driven by the tone arm motor 67 by way of a belt 68 and pulley 69.

The upper surface of the cam 60 supports a clutch winding 70 which, together with the clutch parts 48 and 49, constitutes an electromagnetic clutch. As will be readily apparent, when the winding is energised sufficiently, the clutch part 49 is attracted to the winding, thereby to couple the cam to the drive shaft 44 so that tone arm displacement can be effected by the motor 67.

The upper surface of the cam is formed with a rib 71 having a ramp portion 72 leading to a flat surface 73 which is the upper surface of the cam. The rib is intended to co-operate with a tone arm control shaft 74 (FIG. 6) which is mounted for axial sliding movement. It will be apparent that the control shaft 74 for the majority of the allowed angular positions of the cam will ride on the upper surface of the rib 71 so as to maintain the shaft 74 in its uppermost position in which the tone arm is in a raised position with its pick-up and stylus clear of a stack of records on the turntable. Sufficient rotation of the cam will cause the control shaft 74 to ride down the ramp portion 72 onto the flat surface 73, thereby lowering the control shaft and with it the tone arm, supported by a damper, to cause stylus engagement with a record.

The cam additionally has a lateral camming portion 75 arranged in a particular angular position of the cam to operate a microswitch 76 coupled to the turntable motor 1a.

The underside of the cam is shown in FIG. 9 together with a diagrammatic projection of the ramp 72 to illustrate the relationship between the upper and lower camming surfaces.

The lower camming surface has five annular ribs 77 to 81 to control switches 61, 30, 63 and 64 and a radial rib 82 which acts on a stop 90 to limit the angular movement of the cam.

The upper surface also has a projection 83 which will act on the end 84 (FIGS. 6 and 8) of an arm 85 (FIG. 8) slidably mounted by virtue of a slot 86 in the arm 85 engaged by a peg 87 on the base plate 40. The arm 85 projects through an aperture in the housing 41.

The mechanism also includes a brake member 88 (FIG. 8) mounted to a side wall of the housing 41 (FIG. 6) by means of a plastic spring 89. The brake member 88 is biased radially inwardly with respect to the axis of shaft 44 (FIG. 6) by means of a spring 89a *one end of which is connected to the housing and the other end of which is connected to the brake member 88.*

The brake member is arranged to be urged against the brake vane 52 of the structure 47 but can be displaced away from the vane 52 when acted on in certain angular positions of the cam by the cam projection 83.

Figure 10:
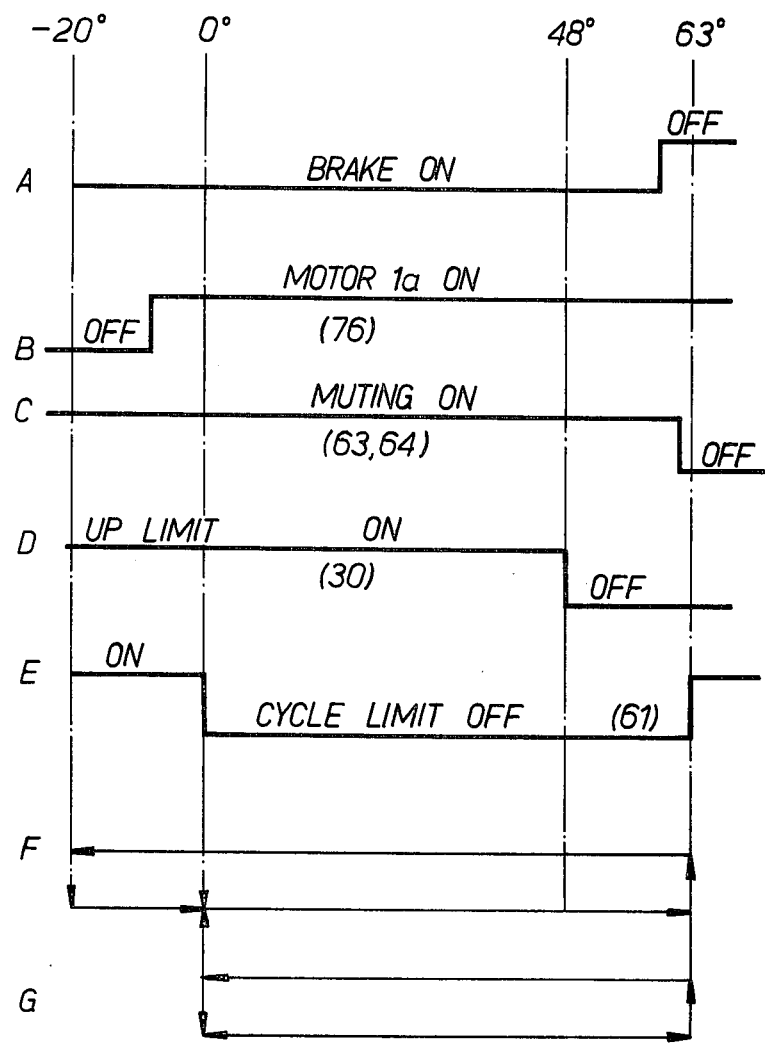
FIG. 10 is a diagram illustrating the operation of the cam.

FIG. 10 is a graph showing the operation of the various elements of FIGS. 6 to 9 in relation to the angular displacement of the cam from a ° position, at which the tone arm is at the rest, forward to a 63° position in which the tone arm is lowered and, in reverse, to a −20° position at which the record changing mechanism is actuated. At about 48°, the tone arm will commence to fall as a result of engaging the ramp portion of the cam.

In FIG. 10 line A denotes the operation of the brake member 88, and it will be seen that it will be moved to the off position after the tone arm has begun to drop.

Line B shows the operation of the turntable motor 1a by the microswitch 76 to cause the motor 1a to commence rotation before the 0° position of the cam. The angular position at which the microswitch 76 operates is selected to cause the turntable to be stationary when record changing occurs (−20°). Line C shows the operation of switches 63 and 64 which are coupled to the audio circuits of the gramophone equipment to produce muting until the stylus has engaged a record. Line D shows the operation of contact 30 on the printed circuit. This switch is opened as the tone arm begins to drop to signal the change in tone arm position. Line E shows the operation of contact 61 on the circuit board. This switch is a cycle limit switch to signal the 0° and 63° positions of the cam for use in controlling the motor 67.

Line F is a diagram illustrating tone arm movement in the case that, after playing, a record change operation is to be effected. The arm commences moving from the point marked X at 0°, i.e. the rest position, the arm moving in towards the centre of the record and, at the 63° cam position, reaching the playing position. At the end of the selected track or tracks, the arm lifts as the cam reverses its direction to the 48° position, and continued rotation of the cam, with operation of the clutch, moves the arm radially outwards to its rest position and further movement of the motor to the −20° position causes a record drop operation. Line G illustrates a similar operation in which only track selection is involved.

Figure 11:
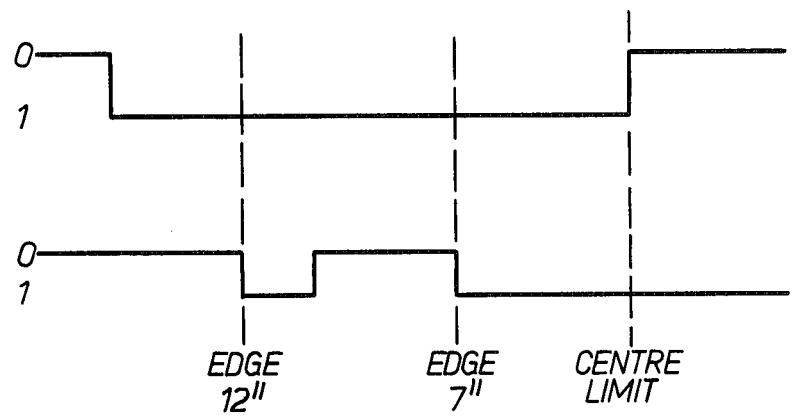
FIG. 11 is a diagram showing waveforms of a signal generator of the cam and clutch mechanism.

FIG. 11 illustrates waveforms of the photodetectors of the two sensors 53 and 54, the upper waveform corresponding to the effect of the vane 50 and the lower waveform corresponding to the effect of the vane 51, it being noted that the vane 51 has a slot to define record edge positions. Logic will receive the signals from the photodetectors and use them in combination to cause the emission of pulses defining two edge positions (for 7 and 12 inch records) and the centre limit position.

Figure 12:
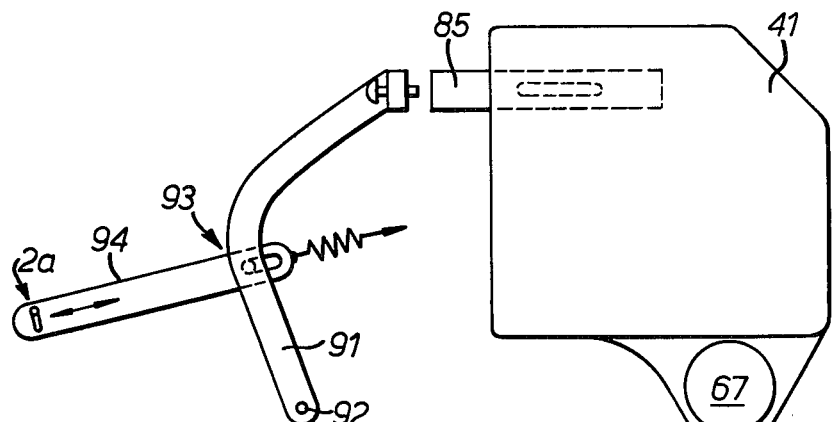
FIG. 12 is a diagram of a record changing mechanism.

FIG. 12 is a diagram showing a plan view of the cam and clutch mechanism from which protrudes the arm 85 actuated by the cam 60. The arm 85 is arranged to act on a lever 91 pivoted to the chassis of the gramophone equipment at 92 and coupled at 93 to an arm 94 which constitutes a conventional part of a record changing mechanism coupled to the centre spindle mechanism at 2a.

Figure 13:
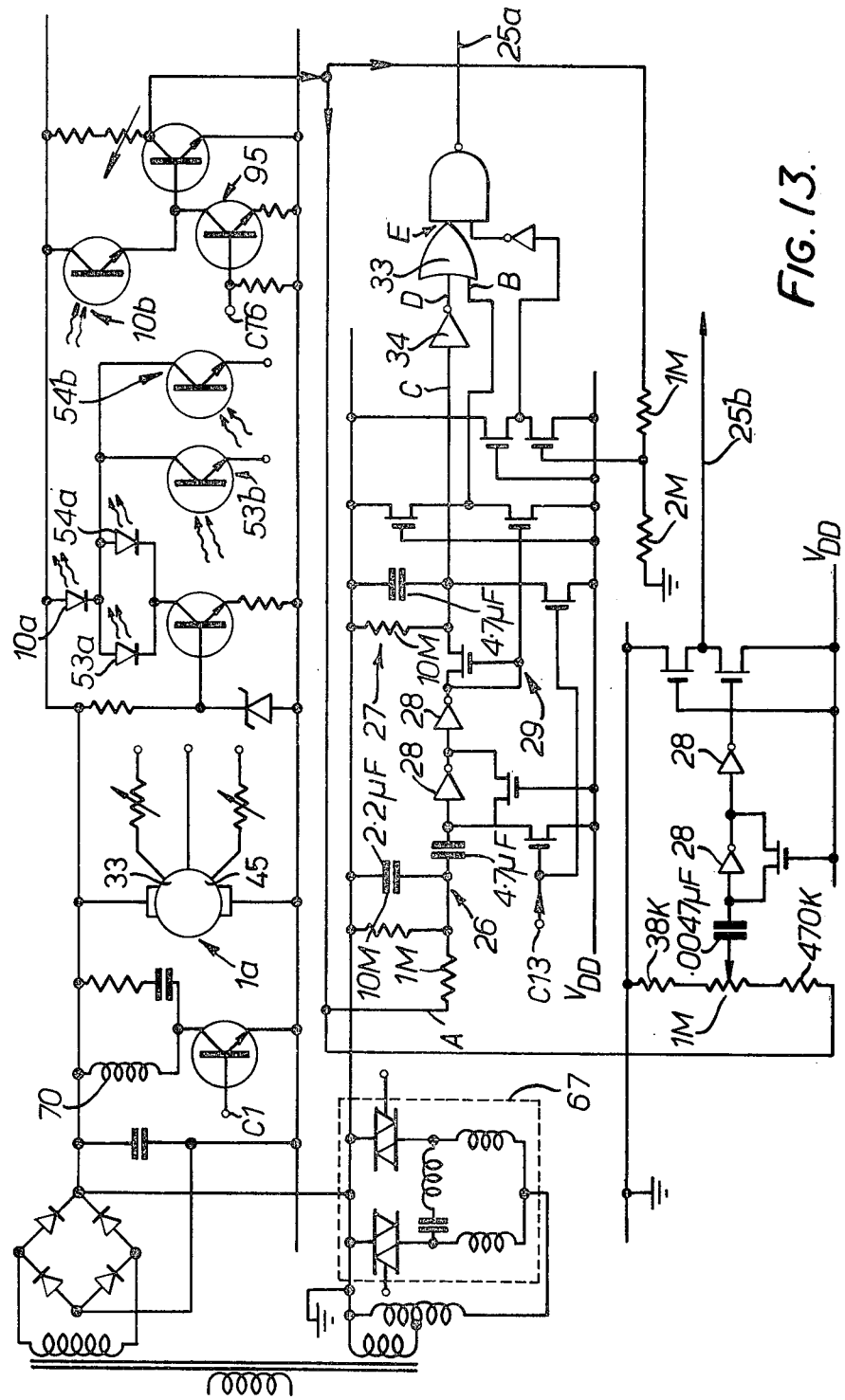
FIG. 13 is a circuit diagram of another embodiment of circuitry for processing the signal of the scanning assembly.

FIG. 13 shows a power supply system and an alternative amplifier system for the signal of the photodetector 10b. This system differs from that of FIG. 4 in that there are two channels, one for the signal when the tone arm is up and the other for the signal when the tone arm is down.

FIG. 13 shows the clutch winding 70, the turntable motor 1a, the tone arm motor 67, the diode 10a and photodetector 10b, light emitting diodes 53a and and 54a of the sensors 53 and 54, photodetectors 53b and 54b of the sensors 53 and 54.

In this case the amplifying transistor for the detector 10b has its input bridged by a transistor 95 to receive an input signal CT6 to cause disabling of the channels. One channel fed by the detector 10b is broadly as shown in FIG. 4 and the same numerals are used where appropriate, this channel having an output 25a. The output signal of this channel is used when the tone arm is down. The capacitance of this channel can be discharged by a signal C13. The other channel has characteristics matched to the tone-arm-up signal, and comprises a differentiator 26, threshold elements 28 and an output 25b.

The embodiment so far described, and using the circuit of FIG. 4 or 13, is associated with an electronic memory for track selections and a logic circuit. The logic circuit is represented by a flow chart in FIG. 16 and its implementation can be effected from such a flow chart by a person skilled in the art. One example of implementation will be described hereinafter with reference to FIGS. 14 and 15 and employs a read-only-memory to store instructions corresponding to the flow chart, in the manner employed by many current pocket calculator circuits.

FIGS. 14 and 15 show block diagrams of integrated circuitry for the equipment described above. However, no display features are included in this embodiment.

Figure 14A:
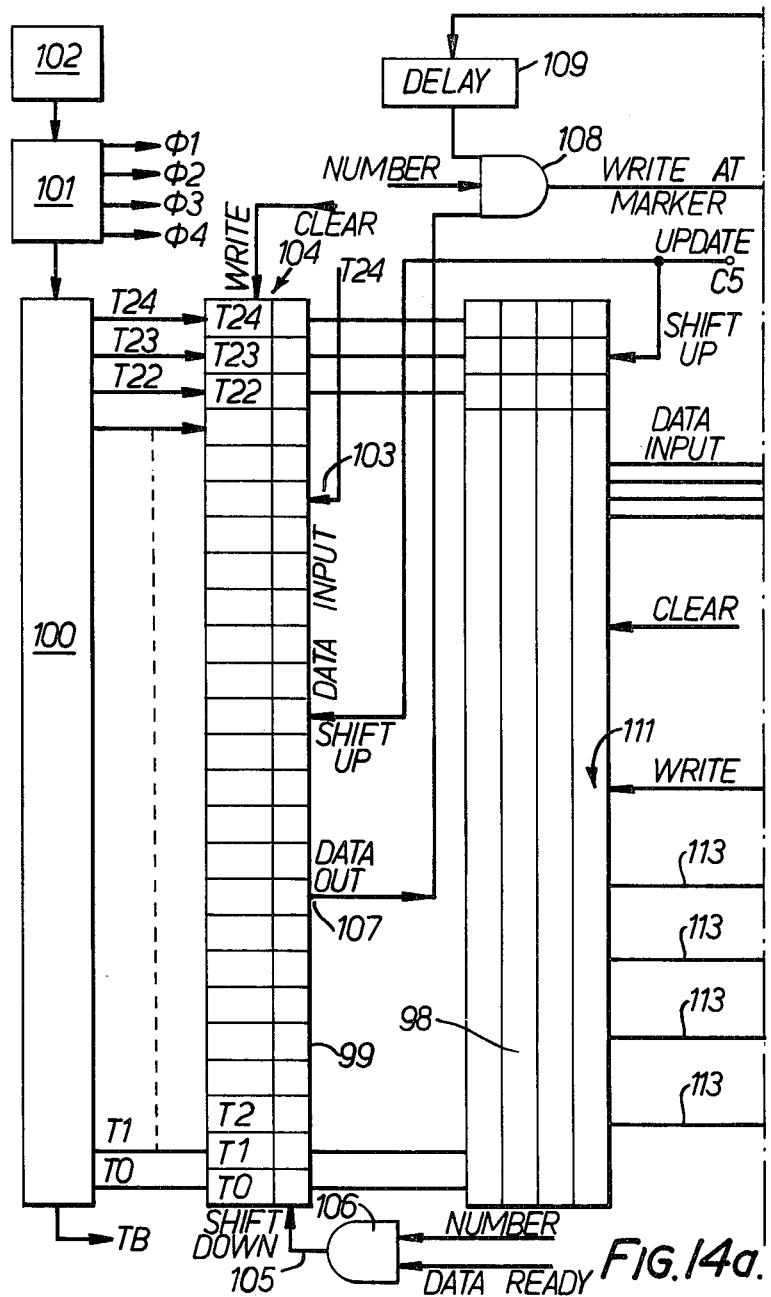
FIGS. 14a–14b and 15a–15c are block circuit diagrams of a logic circuit for the gramophone equipment.
Figure 14B:
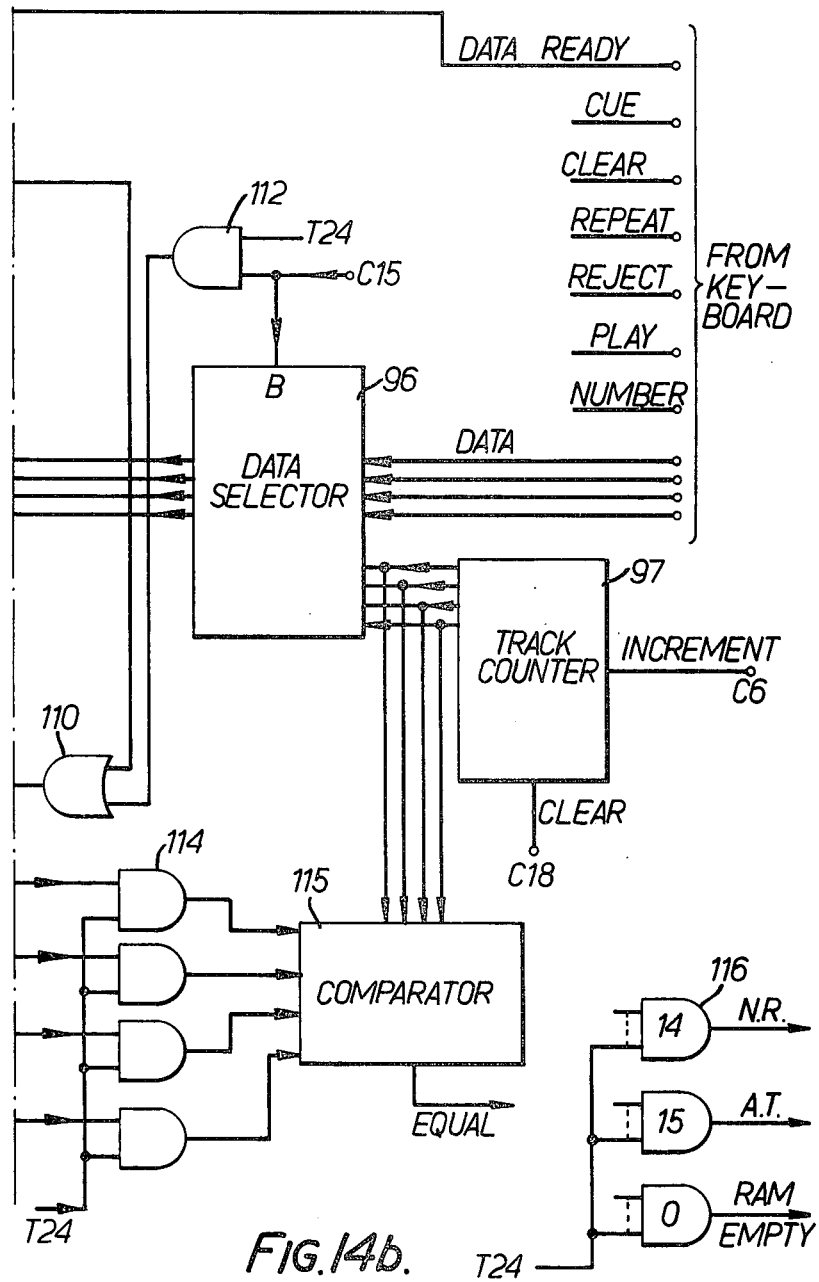

Keyboard 15 is connected by appropriate decoding circuitry to the circuits of FIGS. 14 and 15 as shown in FIG. 4b, derived from the keyboard are: a "DATA READY" signal produced when the data has been decoded; a "CUE" signal; a "CLEAR" signal (or stop signal); a "REPEAT" signal; a "REJECT" signal; and a "PLAY" signal, the last five signals being produced in response to the corresponding buttons of the keyboard. Also produced is a "NUMBER" signal defining whether a 'number' is input. The 'numbers' are the digits 1 to 13, NEXT RECORD (N R) denoted by numeral 14 and ALL TRACKS (A T) denoted by numeral 15. Also produced is a four bit binary word representing the 'number' input. This word also conveys the functions but these are not used in the circuit of FIG. 14 by virtue of the action of the NUMBER signal with continued reference to FIG. 14b, the four bit data word is supplied to a data selector 96 also fed by a track counter 97 incremented by a signal C6 and cleared to a count of '1' by a signal C18. Signals C6 and C18 are produced by the circuit of FIG. 15. The selector 96 has an input B fed by a signal C15 to select either the keyboard data or the track counter data. The selected data passes to a selection store 98, which is a random access memory having twenty five four bit positions for storing track selections. The track selections entered are stored sequentially with a number '15' being entered each time the "NR" key is operated and a number '14' when the "AT" key is operated. For example, a sequence of "2, 15, 3, 10, 15, 1" means a selection of track 2 on record 1, tracks 3 and 10 on record 2 and track 1 on record 3. This store 98 is associated with a marker random access memory 99 (FIG. 14a) with twenty five bit positions. Referring to FIG. 14a, both memories are operated by a timing generator 100 which drives the memories with sequential pulses T0 to T24. A further "BLANK TIME" signal TB is produced by the generator 100 between each group of pulses T0 to T24. The generator 100 is clocked by a clock phase generator 101 driven by a clock 102.

Both memories are connected to receive an "UPDATE" signal C5 to cause their contents to shift up (i.e. towards the T24 position). Memory 99 has a data input 103 connected to receive the T24 pulse. This input is enabled when the "CLEAR" signal appears at a write input 104. Consequently, when the equipment is cleared a marker signal is entered in the T24 position and '0' 's are written in the other positions of memory 99. The marker in the memory 99 is shifted down by a signal at input 105 from a gate 106 fed by the "DATA READY" and "NUMBER" signals. Thus, after clearing the memory and inserting the marker, the marker moves to the T23 position for the input of the first number data to the memory 98. This is achieved by the marker passing from output 107 and going, with the "NUMBER" signal and the "DATA READY" signal delayed by one cycle of the generator 100 in device 109, to a gate 108 which produces a write signal fed via OR gate 110 to a write input 111 of memory 98. An alternative write signal at the OR gate 110 (FIG. 14b) is developed by AND gate 112 (FIG. 14b) from the T24 signal and the signal C15 signifying the input of track counter data to the T24 position of memory 98.

Data is output from the memory 98 at output 113 to gates 114 (FIG. 14b) gated at T24 time so that the T24 position data is input to a comparator 115, also receiving the track counter data. If the data are identical at comparator 115, an "EQUAL" signal is emitted.

As shown in FIG. 14b, gates 116 also decode memory contents of '14', '15' and '0' at T24 position to produce signals "NR" (next record), "AT" (all tracks) and "RAM EMPTY".

Figure 15A:
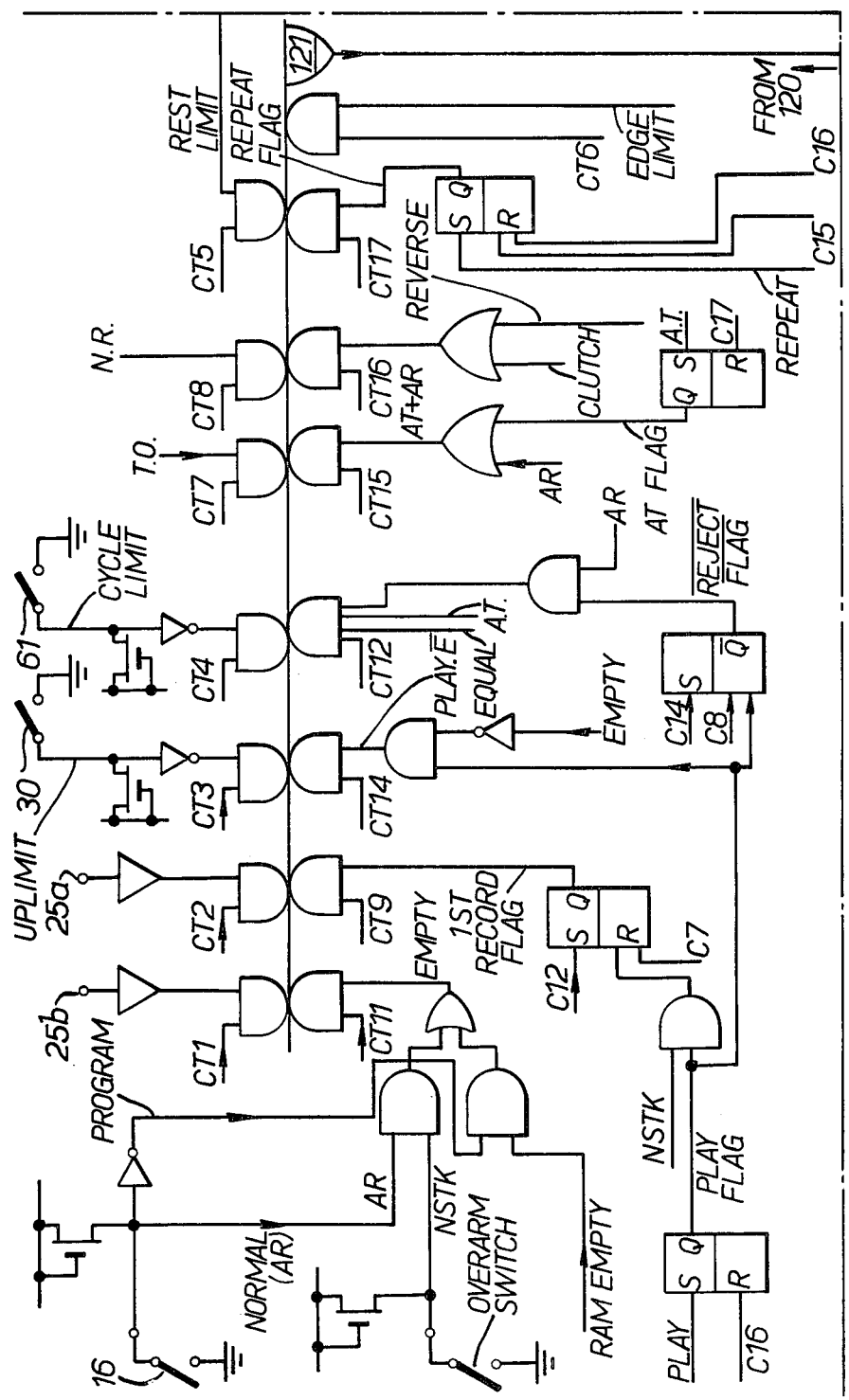
Figure 15B:
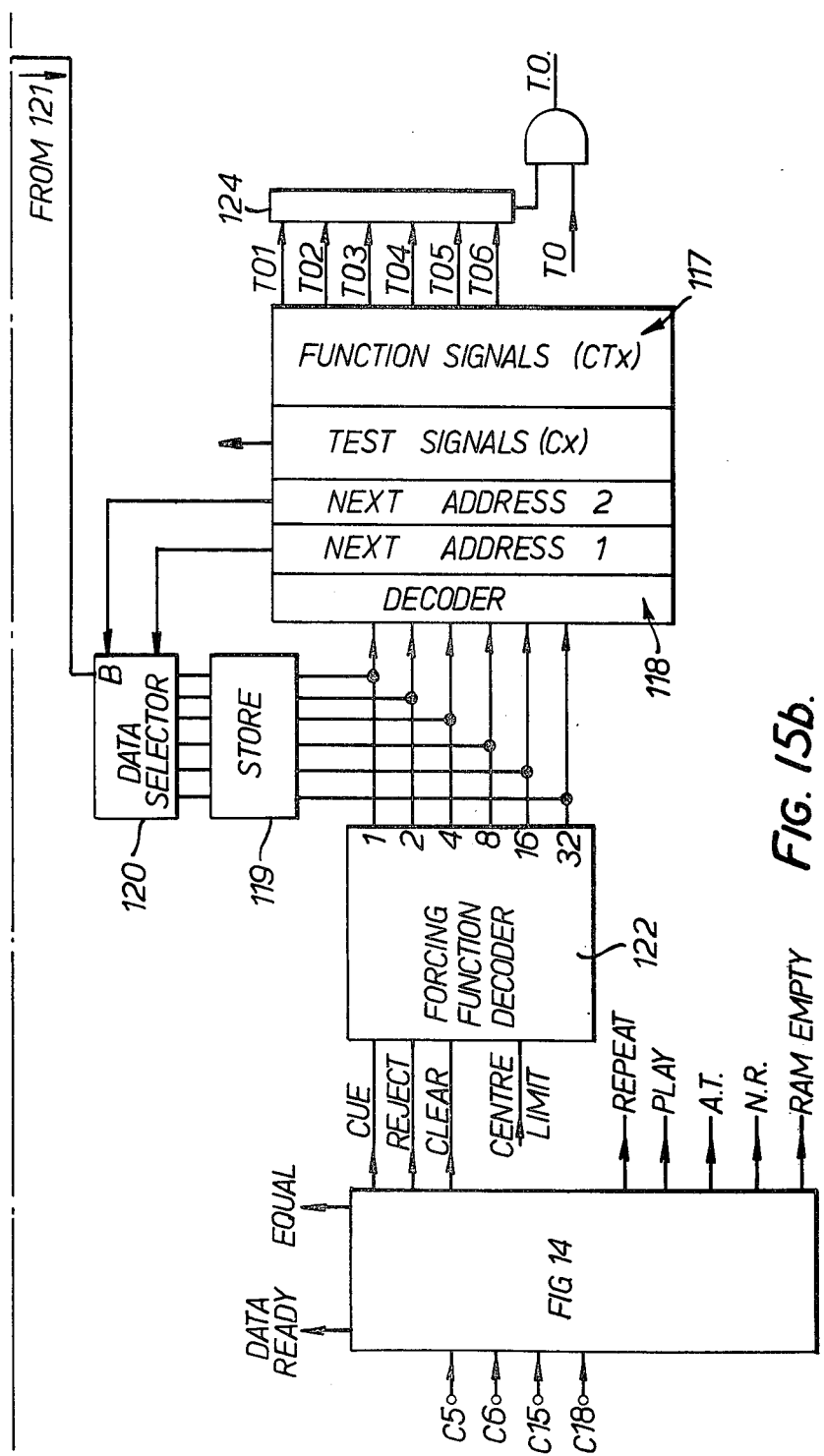

FIG. 15b shows test circuitry of the equipment together with a read-only-memory 117, storing program instructions, and a block representing FIG. 14.

The memory 117 is addressed by an address decoder 118 and stores at each address a word of four parts which are: two alternative "next addresses", test data defining signals CT, and function data defining signals C.

Figure 15C:
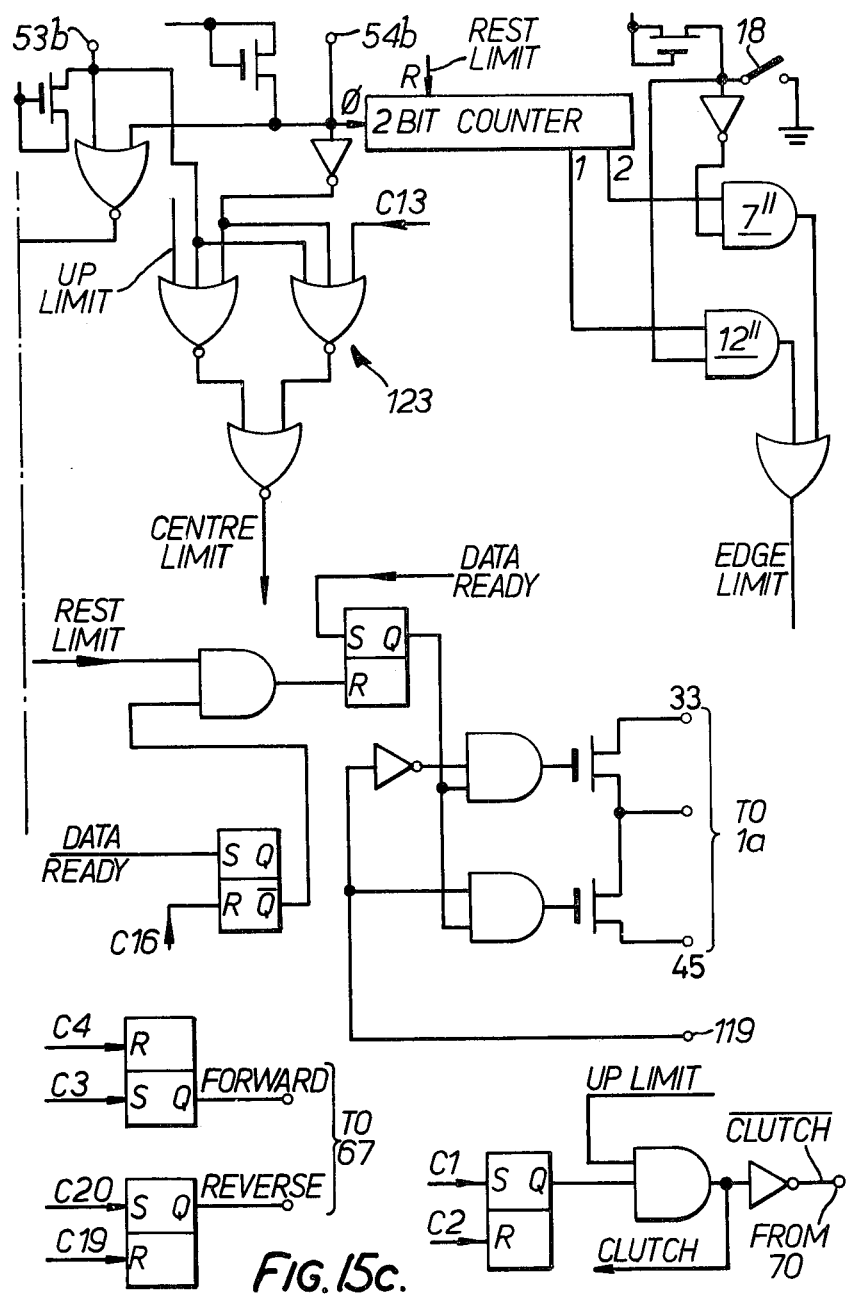

The decoder 118 receives addresses from a store 119 containing one or other of the two "next addresses" from a selector 120 in dependence upon a signal at its input B received from an OR gate 121 (FIG. 15a) which signals the positive or negative result of a test initiated by the signals CT. The store 119 (FIG. 14b) can be overridden by a forcing function decoder 122 (FIG. 15b) addressed by the "CUE", "REJECT" and "CLEAR" signals and also by a "CENTRE LIMIT" signal derived from the sensors 53 and 54 by logic 123 (FIG. 15c).

Referring to FIG. 15b, certain of the function signals are timing signals T01 to T06 which drive a variable length counter 124 cleared by signal T01 and set by the others to a variety of lengths (0.012 seconds, 1 second, 0.112 seconds, 1.84 seconds and 30 seconds). At the end of the appropriate period a time-out signal T.O. is produced. The remaining function signals are as follows:

| | | |
|---|---|---|
| C1 | = | START CLUTCH |
| C2 | = | STOP CLUTCH |
| C3 | = | START FORWARD |
| C4 | = | STOP FORWARD |
| C5 | = | UPDATE |
| C6 | = | INCREMENT TRACK COUNTER |
| C7 | = | DROP (RESET RECORD 1 FLAG) |
| C8 | = | RESET REJECT FLAG |
| C12 | = | SET RECORD 1 FLAG |
| C13 | = | DISCHARGE INPUT CAPACITANCE |
| C14 | = | SET REJECT FLAG |
| C15 | = | TRACK COUNTER TO T24 |
| C16 | = | RESET |
| C17 | = | RESET ALL TRACKS FLAG |
| C18 | = | CLEAR TRACK COUNTER TO '1' |
| C19 | = | STOP MOTOR REVERSE |
| C20 | = | START MOTOR REVERSE |

The test signals are as follows:

| | | |
|---|---|---|
| CT1 | = | TRACK DETECT (UP) |
| CT2 | = | TRACK DETECT (DOWN) |
| CT3 | = | UPLIMIT |
| CT4 | = | CYCLE LIMIT |
| CT5 | = | RESET LIMIT |
| CT6 | = | EDGE FLAG |
| CT7 | = | TIME OUT |

```
CT8   =  NR
CT9   =  1st RECORD FLAG
CT11  =  EMPTY
CT12  =  EQUAL
CT14  =  PLAY.E
CT15  =  AT + AR
CT16  =  ARM STOPPED OR FORWARD AS + F
```

FIGS. 15a–15c will now be further explained with reference to the flow chart of FIGS. 16a–16d.

Figure 16A:
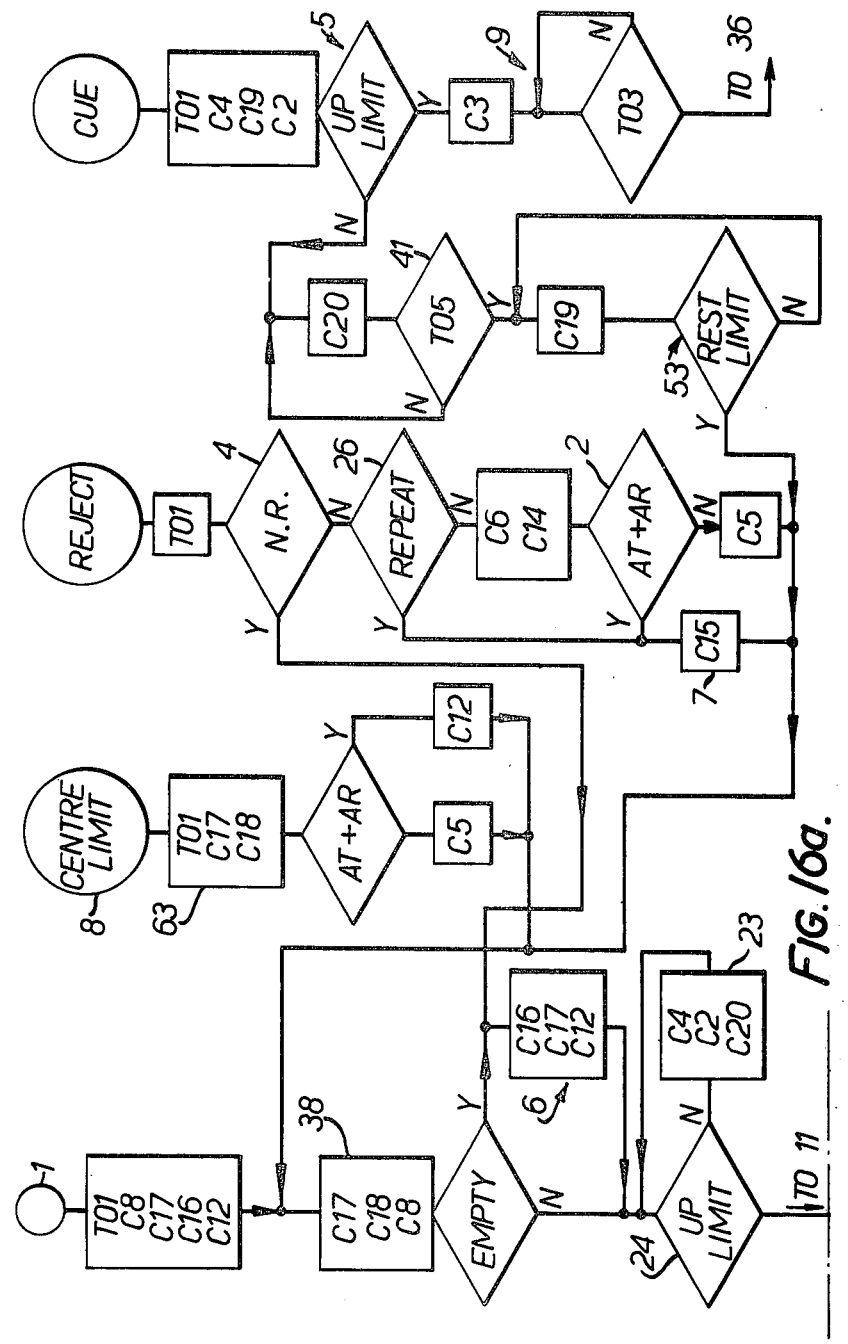

Referring to FIG. 16a, when the machine is first switched on or the "STOP" button is subsequently pressed, the sequence is entered at step 1 of the flow chart at which the following signals are emitted: TO1, C8, C17, C16 and C12. These signals clear the timing counter, reset a reject flag, reset an "all tracks" flag, reset a play flag and set a "1st Record" flag. These flags are stored in bistable circuits of FIG. 15. The next address is step 38 to test using CT11 whether or not the selection store 98 is empty. This leads directly, or via step 6, to step 24 in which CT3 tests to check, with reference to the limit switch 30, if the arm is up and, if not, step 23 is entered to cause the arm motor to reverse (C4, C2, C20). The motor then drives the cam in reverse to lift the tone arm. When the up limit switch 30, operated by the cam, signals that the up position is reached, the sequence goes to step 11, in FIG. 16b, tested by signal CT5.

Figure 16B:
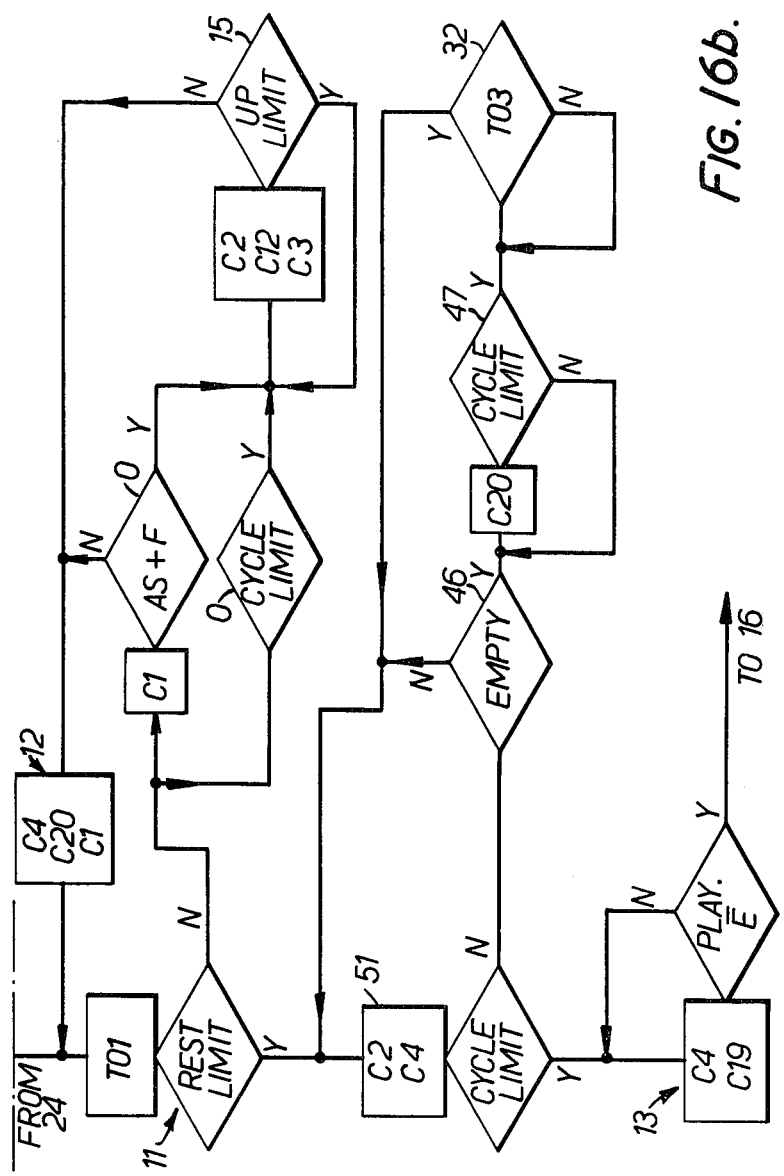

Referring to FIG. 16b, if the arm is not in its rest (determined by inputs from detectors 53 and 54), steps 0, 15 and 12 are entered to engage the clutch coupled to the tone arm and reverse the motor until the arm reaches the rest. If step O detects that the arm is stationary or moving foward (AS + F) or that the cycle limit has been reached, step 15 causes the motor to drive forward until the arm just begins to drop. The motor is then reversed and the arm clutch engaged (step 12), and the sequence cycles again via step 11 until the arm reaches the rest.

When the rest limit test is positive, the signal TO4 of the next step 51 sets up a delay time of 0.112 seconds during which the motor continues to drive in reverse. At the end of this time, the clutch is disengaged and step 50 entered by test signal CT4 to test if the motor cycle limit switch 61 has operated. Steps 46, 47 and 32 are entered until the cycle limit is reached. If the memory 98 is empty, step 47 causes the turntable motor to be stopped. In any case the arm reaches the rest with the motor 67 stationary at its correct position (cycle limit) and the sequence stops at step 13. If a selection is entered and the "PLAY" key is pressed (PLAY.E), in either order, signal CT14 generates a positive test and the sequence proceeds to step 16 at which the timer counter is cleared and the rest limit tested (CT5). If the test is postive step 18 (FIG. 16c) is entered and the memory 98 is interrogated to see if the next stored instruction is "15", i.e. if the "NR" signal exists (CT8). When "NR" exists, i.e. the next record is required, steps 19 and 3 are entered. At step 19 the motor goes into reverse for a few degrees to operate the record drop mechanism and at step 3 the data in the selection store is updated, i.e. shifted-up to obtain the next selection. Step 22 is entered to test if the "1st record" flag is set (CT9), i.e. to see if the first record must be dropped. If so, a drop is effected via step 46.

If a record drop is not required, step 34 is entered and the tone arm is driven forward to detect an edge limit (CT6) for a seven or twelve inch record, depending upon switch 18. When the edge of the record is detected, step 29 is entered. Step 29 (CT12) then tests whether the track count in counter 97 equals the track stored in the selection store at position T24. If the "EQUAL" signal is present, the track reached is the track selected and the clutch is disengaged (step 27), the motor stopped and timing steps 27, 20 and 37 carried out to ensure that an integral number of revolutions (at 33⅓ r.p.m.) is effected between the track detection and the stylus reaching the record to compensate for record eccentricity by ensuring that the stylus drops at substantially the same angular position at which the gap was detected. If the first track is not required a delay is introduced by step 17 to ensure that the record edge has been completely passed and then step 28 is entered (CT1) and the program recycles at this point until the next band or gap is found, when step 49 is entered to increment the track counter (C6) and test (CT12) the "EQUAL" signal. If this next track is not required steps 30, 31, 28 and 49 are cycled through until the track required is found.

Figure 16D:
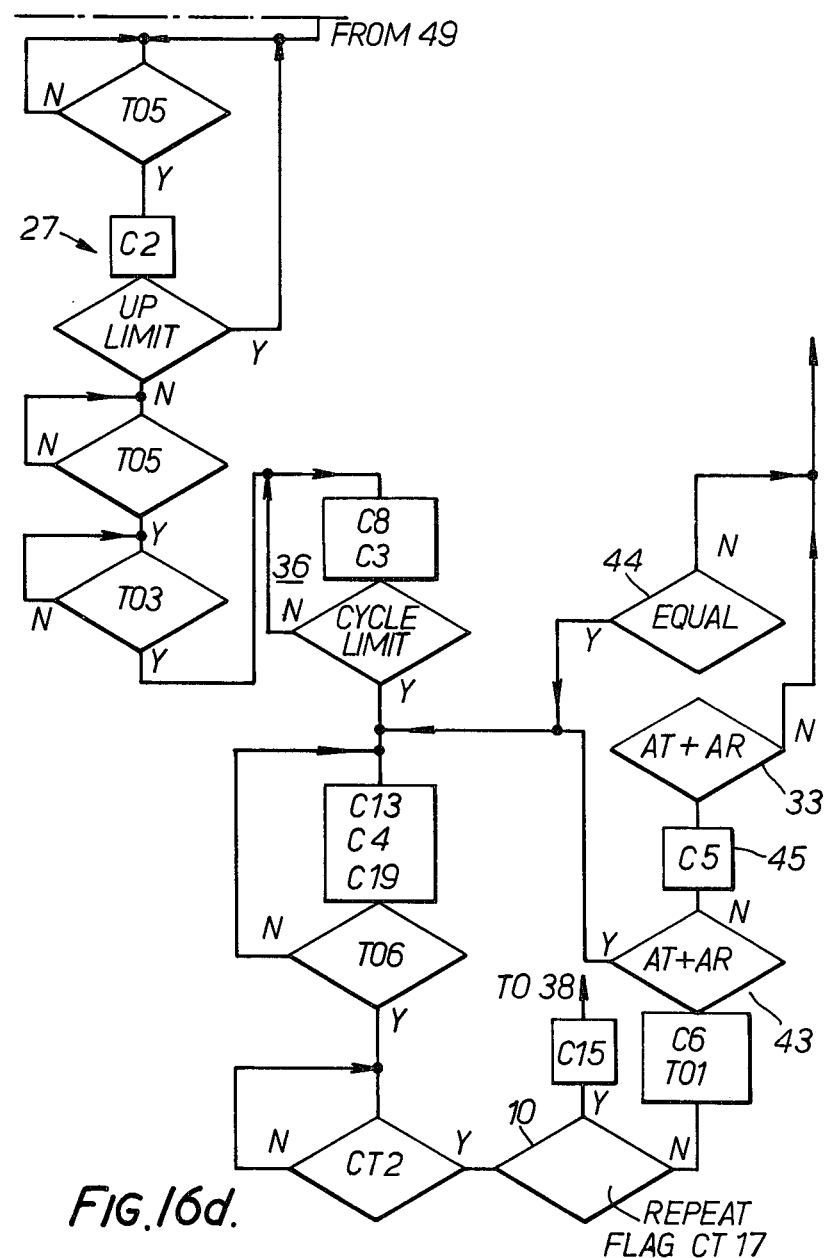

After the arm has stopped above the selected track by clutch disengagement, the arm motor is driven forward (step 36), shown in FIG. 16d, ultimately causing the brake to release from the arm and the arm to drop down onto the record. The arm motor is stopped by step 39 when the cycle limit switch operates (CT4) indicated in FIG. 16d. Also, signal C13 is produced to discharge the input capacitance of the amplifier channels of FIG. 13. Step 39 involves a time period of about 30 seconds to prevent entry to step 40 until the stylus, which is now playing the record, has moved clear of the gap onto the selected track. When the optical system detects the end of the track being played (step 40, CT2), step 10 is entered to test (CT17) whether or not a repeat of the selected track is required. If not, step 43 (FIG. 16d) causes the track counter to be incremented and the timer to be reset, and the AT (all tracks) flag to be tested (CT15) together with the "All records" (normal mode) signal.

If the machine is in normal mode i.e., being used as a conventional record player or if all tracks are selected, step 39 is entered and the pick-up stays on the record. The cycle of steps 39, 40, 10 and 43 is passed through until the centre of the record is found (CENTRE LIMIT). The "centre limit" signal is produced not only in dependence upon the detectors 53 and 54 sensing an arm position (with the arm down) corresponding to the centre of a 33⅓ r.p.m. record but also in dependence upon a band having been detected. This avoids premature lift off in cases where a track extends beyond the normal 33⅓ limit (e.g. in 45 r.p.m. records). This test is made by C13 (FIG. 15) which is produced by step 39 having passed through the cycle of steps 40, 10 and 43 and therefore having sensed the end of a track (step 40), i.e. signal C13 is used to signify the end of a track. It is also pointed out that if the arm is up and reaches the detected centre, then the centre limit signal will also be produced independently of C13.

If the machine is in the program mode or all tracks are not signalled, the memory 98 is updated (shifted-up) at step 45, (FIG. 16d) test 33 effected and the "EQUAL" test again made (step 44). If the selection is a wanted one, step 39 is entered and the pick-up stays on the record. If not, the sequence goes to step 38 which tests to see if the selection store is empty; if it is, the play "1st Record" and AT flags are reset at step 6 (FIG. 16a).

The sequence from step 6 onwards brings the tone arm back to the rest.

If the arm traverses to the centre as a result of there being no record on the turntable or there being a selection greater than the number of tracks on the record being made, the "CENTRE LIMIT" signal will be produced as already described and this forces the sequence to go to step 8 (centre limit) and then to steps 63, 35 and 3 to bring up the next selection (if there is one) to position T24 of the store 98 before returning to step 38.

If the machine is in normal mode, "centre limit" causes step 21 to be entered to set the "1st Record" flag.

Using the optical system to detect that the record has ended when the arm is down enables a fixed centre limit position to be used. If a fixed centre limit were used alone, then, as already indicated, it would be found that if the centre limit were set to lift the arm correctly on 12 inch records it would lift the arm while some 7 inch records were still playing.

Referring to FIG. 16a, if the reject button is pressed and the machine is in program mode, steps 4, 26, 2 and 3 cause the selection store to be updated or shifted to the next selection; step 38 is then entered to return the arm to the rest.

If the reject button is pressed and the machine is in normal mode, step 7 increments the track counter and writes the resultant count into the top of the selection store (step 7). The sequence goes to step 38 and the next higher number track on the record is ultimately selected.

The function of the "CUE" button is to enable the arm to be lifted or lowered at any desired point on the record without the arm moving laterally.

If the "CUE" button is pressed and the arm is up, steps 5, 9 and 36 drive the arm motor forward to cycle limit position, lowering the arm in the process.

If the "CUE" button is pressed and the arm is down, steps 5, 41 and 53 reverse the arm motor, causing the arm to be lifted and returned to rest.

From the description so far given it will be readily apparent to the skilled reader how to implement the described circuit using commercially available logic building blocks. However, another method of implementing the circuit is to form it as a single integrated circuit, e.g. of insulated-gate field-effect transistors. Moreover some of the elements of FIG. 4 or 13 could also be included in such an integrated circuit.

The way in which the signals supplied by the keyboard to the circuit of FIG. 14 are produced is of no significance to the present invention and one can use a decoding circuit of any suitable form which can be readily designed by one skilled in the art.

Figure 20:
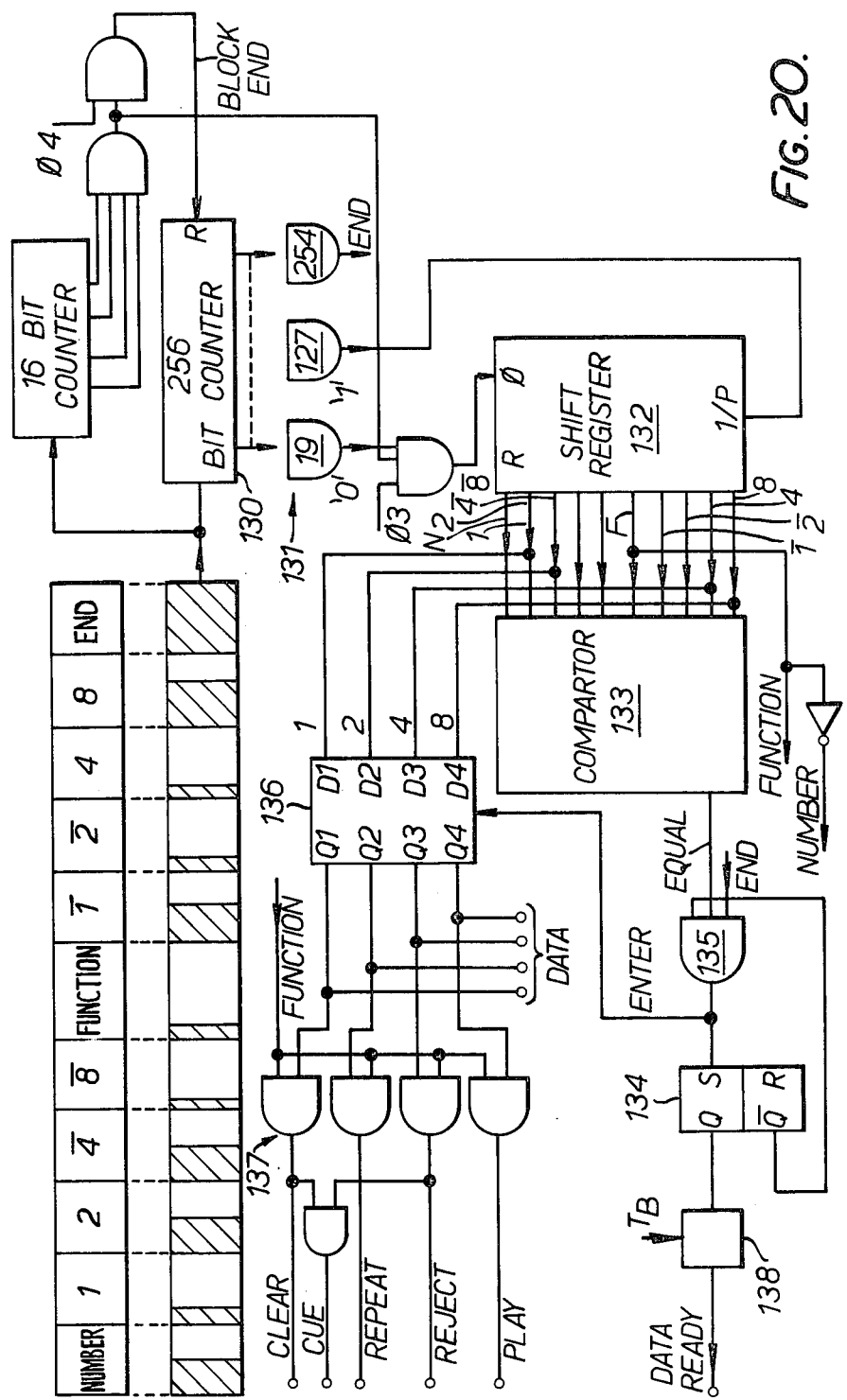
FIGS. 20 and 21a–21b are block diagrams showing circuitry for decoding keyboard signals.

FIG. 20 shows one embodiment of circuit for producing the signals supplied to FIG. 14.

Firstly, it is assumed that the data input to the circuit of FIG. 20 is in the form of a block of eleven sets of pulses, the first five sets and the second five sets conveying the same data but in inverse form and the final pulse set being an end-of-block pulse set. In the block, a pulse set of about 160 pulses denotes '1', a pulse set of about 32 pulses denotes '0' and a pulse set of about 320 pulses denotes the end-of-block. The pulses have a repetition rate of about 40KHz. The example in FIG. 20 shows a representation of the "number" 10, the pulse sets being hatched. The pulses are supplied to a 256 bit counter 130 the output of which is decoded by gates 131 at counts of 19, 127, 254 to detect '0', '1' and END respectively. The data is clocked into a shift register 132 and compared in a comparator 133 which, on sensing equality of data, emits an "EQUAL" signal to set a latch 134 which operates a single shot multivibrator 138 which produces the data ready signal for one cycle of the system, i.e. from TB time to the next TB time. The data is fed to a latch 136 triggered by the "ENTER" signal from a gate 135 and fed to decoder gates 137 to derive the function signals.

Figure 21A:
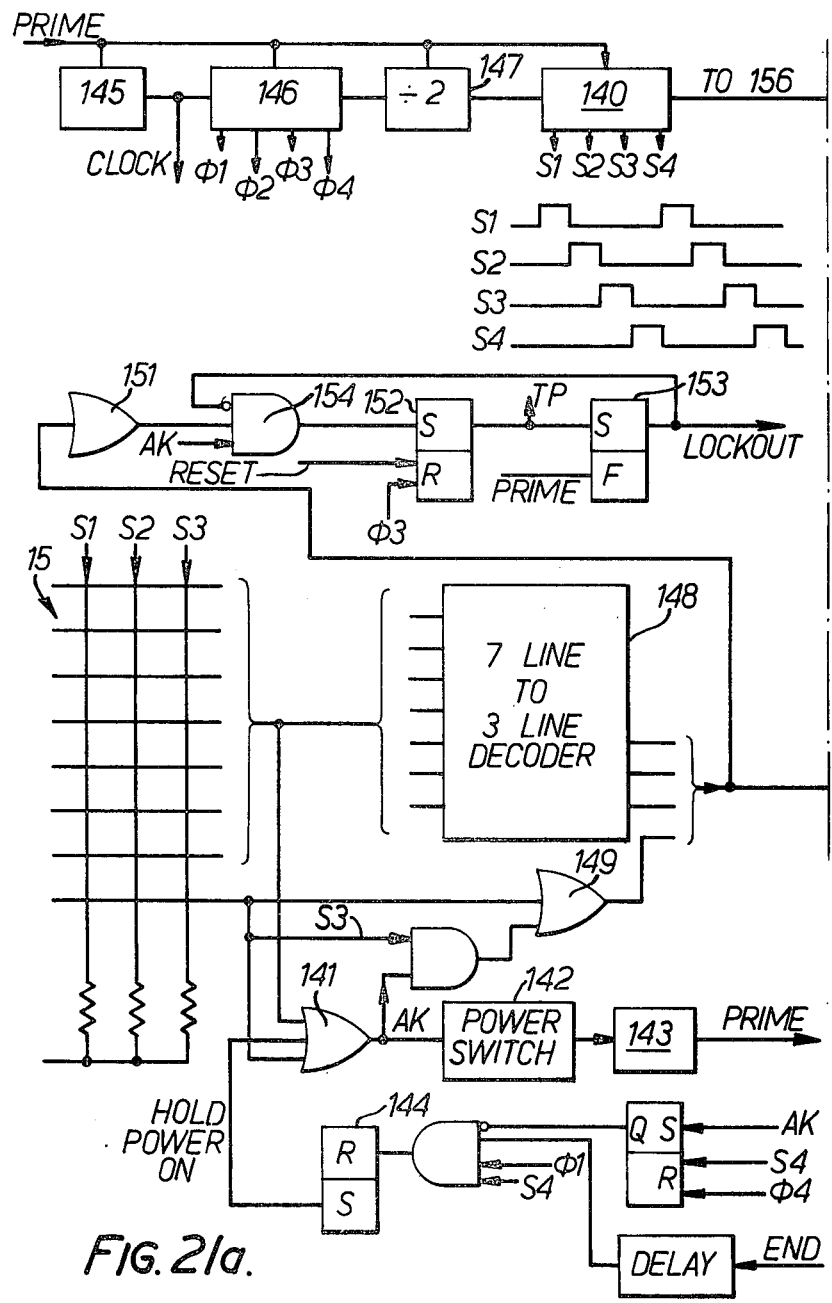
Figure 21B:
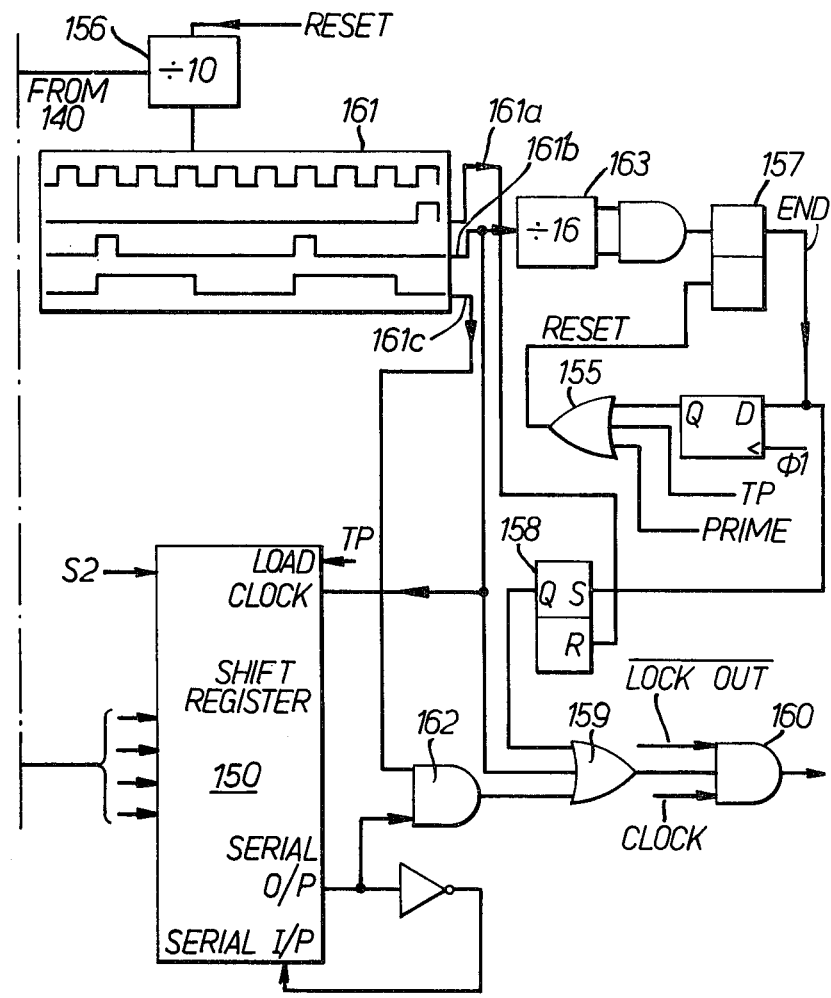

FIGS. 21a and 21b shows how the signal block of FIG. 20 can be produced.

Referring to FIG. 21a, the keyboard 15 is shown as a matrix having three columns addressed successively by signals S1 to S3 generated by a generator 140. The "numbers" are associated with S1 and S2 and the "functions" with S3. When any button is operated a signal passes to OR gate 141 which generates an AK signal which operates a power switch 142 to apply power to the circuit (gate 141 is independently powered). Priming circuit 143 then emits a 'PRIME' signal to set the circuit of FIG. 21 to its starting condition. A "hold power on" signal is accordingly generated by latch 144 to keep switch 142 on.

An oscillator 145 is started by the 'PRIME SIGNAL' and drives a clock generator 146 and the S generator 140 via a divide-by-two circuit 147.

A decoder 148 converts the signals from the keyboard into a binary code which is passed with a signal from OR gate 149 to a shift register 150. OR gate 151 is also operated when the appropriate S pulse strobes a column in which a button is operated, this setting a latch 152 which generates a signal TP which sets a latch 153 to inhibit AND gate 154.

Referring to FIG. 21b, TP is a pulse used to load the shift register 150 with data for the decoder 148, so that the register 150 holds a binary code representing the button operated.

When pulse TP is generated, an OR gate 155 generates a reset signal to reset a counter 156 and a latch 157. Oscillator 145 runs at 40KHz and counter 156 changes state every 0.8m.secs. and causes a latch 158 to be reset after 10 pulses, e.g. 8m.secs. Counter 156 feeds a decoder 161 having three outputs, 161a to c. Output 161b drives a gate 159 directly for generating '0' blocks of 0.8m.sec. each via a gate 160. Output 161b also clocks register 150 the output of which is gated by gate 162 with the output 161c to generate 4m.sec. '1' blocks when the register output is logical '1'.

The serial output of register 150 is inverted and fed back to an input of the register for transmission in inverted form.

Counter 163 counts complete cycles of counter 156 and at the start of the twelfth cycle sets latch 157 to generate an END signal to reset latch 144 after a delay of at least 0.8m.secs. and to set a latch 158 which causes the production of the END signal block.

The output of gate 160 can connect directly to the circuit of FIG. 20 or be coupled indirectly thereto, as by ultrasonic pulses derived from the block of signal pulses.

Figure 17:
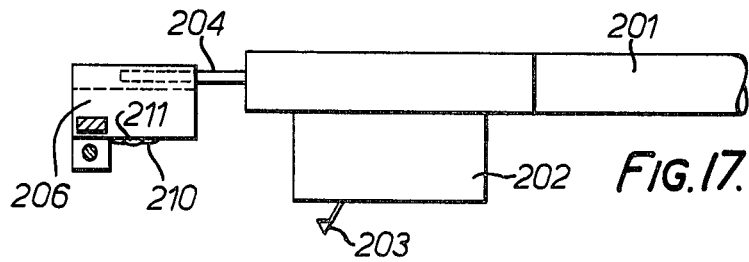
FIGS. 17, 18 and 19 show in side view, end view and plan view a track selection system applied to an existing record deck.
Figure 18:
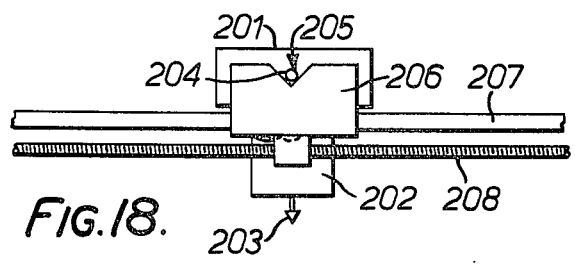
Figure 19:
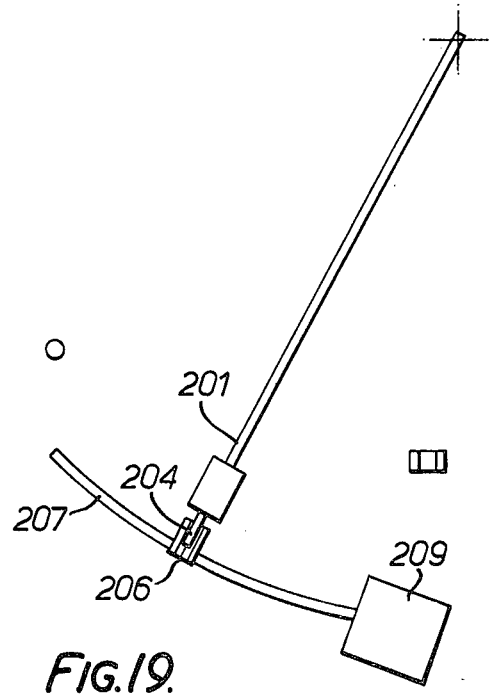

FIGS. 17, 18 and 19 show in side view, end view and plan view a track selection system applied to an existing record deck. In this form, therefore, the invention can be a kit for modifying existing equipment.

FIG. 17 shows in side view the end of a tone arm 201 of an existing record deck. As is conventional, the end of this tone arm carries a cartridge 202 with stylus 203.

In this embodiment, apparatus is provided which is to be coupled to the tone arm for track selection. This apparatus comprises a pin 204 attached to the end of the tone arm 201.

FIG. 18 is an end view of the tone arm 201 and shows that the pin 204 rests in a groove 205 of a mounting member 206 of the track selection apparatus. This mounting member 206 is slidably mounted on a transport arm 207 and engages with a lead screw 208 so that, when the lead screw 208 is rotated, the mounting member 206 may be driven in either direction along the transport arm. The path of the member 206 is slightly curved, whilst the lead screw is straight so that the two are coupled by a slotted member (not shown) allowing the member 206 to traverse freely radially of the arm 207.

As shown in the plan view of FIG. 19, the transport arm 207 extends substantially parallel to the path traced by the stylus of the tone arm 201, so that the displacement of the mounting member along the transport arm is effective to convey the tone arm 201 over the surface of a record in conventional fashion. Both the lead screw 208 and the transport arm 207 extend into a drive arrangement 209 which contains a first motor for rotating the lead screw and a second motor which is operable to raise and lower the transport arm thereby to lower the stylus 203 onto a record and lift the stylus from a record. These motors can be arranged to be controlled by the circuitry which has been described hereinbefore.

In a manner similar to that described hereinbefore, the mounting member 206 carries at its lower surface a photodetector 210 and a light source 211. This photoelectric arrangement operates, as before, in a reflective mode, i.e., the detector produces an electrical signal representing the amount of light which has originated from the light source and which has been reflected by the record surface.

It is possible with the arrangement according to FIGS. 17 to 19 to maintain the existing tone arm drive arrangement for driving the tone arm when track selection is not required and this existing drive arrangement may be connected to the circuitry of the apparatus to render it ineffective during track selection.

The operation of this embodiment will now be described.

When the system detects that a track selection has been made and stored, the drive arrangement 209 is operated to commence the traversing of the mounting member 205. The lead-in part of the record will accordingly be sensed by detector 210 to produce a first pulse and this pulse will be stored and compared with the selection data in the memory. If the comparison indicates that continued motion is necessary, drive arrangement 209 is not stopped at this time. When coincidence is found, the driving of the mounting member 205 is ceased and the driving of the transport arm 207 is commenced to lower the stylus onto the record. In practice, the detector 210 will be slightly in advance of the stylus so that the appropriate gap can be detected before the stylus has reached it and appropriate delays may be incorporated in the system to ensure that when the stylus is lowered it is directly above the gap concerned. Alternatively, as there will be a predetermined number of motor revolutions from the moment of sensing coincidence to the moment of lowering the arm, circuitry may monitor motor armature current changes to decide when, after coincidence, the arm is to be lowered.

When the transport arm has been lowered sufficiently to bring the stylus onto the record, its drive is stopped and the mounting member is again driven until a further pulse, denoting the next gap, is received. This causes the drive of the mounting member 205 to cease.

The result of this is that the track selected is caused to be played. At the end of the track, the pin 204 reaches the mounting member and this condition is sensed and signalled to cause the drive arrangement 209 to operate to lift the transport arm 207 to remove the stylus from the record.

Various means may be adopted to sense when the pin 204 has reached the required position in relation to the mounting member 205. For example a photodetector may be used to detect this pin. In the alternative a fine hair-wire switch may be mounted on the mounting member so as to be actuated by the pin.

We claim:

1. Gramophone equipment comprising a turntable for supporting a phonograph record of the kind having recorded tracks with a relatively high groove density and bands with a relatively low groove density between, preceding and following said tracks, a movable tone arm for supporting a gramophone pick-up, drive means for the turntable and for displacing the tone arm across the turntable from a rest position and also for displacing the tone arm towards and away from the turntable, and control means for controlling the drive means to select recorded tracks of a record in dependence upon the reflectivity of the record, the control means comprising: photoelectric scanning means movable across the turntable for scanning such a record when on said turntable and comprising a source of light to illuminate the record and a photodetector to produce a signal which varies in dependence upon the amount of said light reflected from the scanned portions of such a record, so that the signal comprises signal portions indicative of respective ones of said bands; counter means coupled to said photodetector for counting said signal portions; a signal generator responsive to the position of the scanning means to produce an edge signal when the scanning means reaches a given position corresponding to the edge of a record; and means connected to receive said edge signal for inhibiting the count in the counter from exceeding a count greater than that corresponding to the first of the bands until a time has elapsed after the production of the edge signal which is sufficient for the scanning means to have scanned beyond the first, edge, band into the first recorded track.

2. Equipment as claimed in claim 1, wherein said control means has means responsive to a signal portion, indicative of a band, occurring when the tone arm is down to operate the drive means in a mode to move the tone arm away from the turntable, thereby to disengage from a record at the end of playing of a selected track.

3. Equipment as claimed in claim 2, wherein the drive means comprises a reversible motor, a cam, having a ramp portion, coupled to be driven by the motor, a tone arm drive shaft, a releasable magnetic clutch for selectively coupling the cam and the drive shaft, and a tone arm control member mounted to engage said cam to cause lifting and lowering of the tone arm as said member rides up and down the ramp portion.

4. Equipment as claimed in claim 3, further comprising selector means manually operable to define a track selection; electronic memory means for storing a track selection defined by the selector means; comparator means coupled to the counter and memory means to compare the stored selection with the number, as stored in said counter, of said signal portions occurring during scanning of the gramophone record, and to produce a control signal for said drive means in dependence upon the comparison to cause the tone arm to move its pick-up onto the band immediately preceding a track defined by the stored track selection;

wherein the memory means comprises a plurality of storage locations coupled to the selector means to store a sequence of track selections as defined by the selector means, and said control means includes means for operating the drive means, under the control of the scanning means, to move the tone arm to produce the stored sequence of selections, the means also comprising means for inhibiting said motor mode when the next track defined by said memory means is the track immediately following said selected track.

5. Equipment as claimed in claim 4, wherein the control means comprises a processing circuit for the signal of the scanning means, the processing circuit comprising filtering means adapted for a greater response to signal changes at the rates occurring on scanning into a band when the tone arm is travelling with the pick-up engaging a record than to signal changes at a higher rate.

6. Equipment as claimed in claim 5, and comprising means for maintaining the tone arm completely disengaged from the drive means during playing of a record.

7. Equipment as claimed in claim 4, and comprising a record changing mechanism coupled to said drive means, the selector means having record selection means for entering record selections in addition to track selections, the memory means being coupled to store entered record selections in its storage locations and the drive means being operable in response to a stored record selection to provide a mechanical movement to actuate said record changing mechanism.

8. Equipment as claimed in claim 7, and comprising display means for displaying each selection when entered by the selector means and for also displaying each selection as it is played, the display means also being operable to display a record number when selected and also when that record is playing.

9. Equipment as claimed in claim 7, said control means including means to control the drive means to stop turntable rotation during operation of the record changing mechanism.

10. Equipment as claimed in claim 5, wherein said filtering means comprises band pass means.

11. Equipment as claimed in claim 10, and comprising means responsive to tone arm vertical position to change the effect of said filtering means in response to tone arm position, so that, when the arm is in its raised position, the processing circuit provides an alternative filtering characteristic adapted to the nature of the signal of the scanning means with the arm raised and moving across the turntable.

12. Equipment as claimed in claim 10, wherein the processing circuit comprises two channels the inputs of which are coupled to receive the signal of the scanning means, a first of which channels comprises said filtering means, and the output of which provides a signal for the control means when the tone arm is in a lowered position and the output of the second channel providing a signal for the control means when the tone arm is in its upper position.

13. Equipment as claimed in claim 12, the control means having means responsive to tone arm position to utilize said peak signals is indicative of bands when the tone arm is in a lowered position in which the scanning means scans across the turntable with pick-up engagement of a record.

14. Equipment as claimed in claim 12, wherein the peak detection circuit is only in the first of the two channels.

15. Equipment as claimed in claim 12, wherein the processing circuit comprises analysing circuit means for analysing said signal portions to produce therefrom peak signals in response to peaks of the signal of the scanning means, the control means being arranged to utilize said peak signals as indicative of the bands.

16. Equipment as claimed in claim 1, wherein the scanning means has its own drive arrangement coupled to the drive means for movement of the scanning means independently of the tone arm.

17. Equipment as claimed in claim 16, wherein the drive arrangement has a releasable coupling with the tone arm so that the tone arm can be moved with the scanning means.

18. Equipment as claimed in claim 1, wherein the scanning means are carried by the tone arm and the signal generator is coupled to the tone arm to sense tone arm position.

19. Equipment as claimed in claim 18, wherein the inhibiting means inhibits any alternation of the count in said counter in consequence of signal portions produced by the scanning means from the moment that the tone arm leaves said rest position and until said time has elapsed, and there are means for resetting the counter to the count corresponding to the first of the bands by the time at which the tone arm leaves said rest position.

20. Equipment as claimed in claim 18, wherein the control means comprises timing means for delaying dropping of the tone arm when the band immediately preceding a selected track is sensed, the delay approximating an integral number of revolutions of the turntable less the time for said arm to drop.

21. Equipment as claimed in claim 18, and comprising brake means for acting on the tone arm when in a raised position and substantially to prevent tone arm momentum from moving the tone arm radially inwardly of its required position to select a track.

22. Equipment as claimed in claim 21, wherein the brake means is coupled to act on the tone arm throughout its movement across the turntable, and there being means to disengage the brake means from the tone arm only when the tone arm has stopped.

23. Equipment as claimed in claim 22, further comprising selector means operable to define a track selection, electronic storage means for storing a selection defined by said selector means, and means for producing a control signal for said drive means responsive to a comparison of the stored selection and a number stored in said counter, for causing said tone arm to move its pick-up onto the band immediately preceding a track defined by the stored track selection, and further comprising means for maintaining the tone arm completely disengaged from the drive means during playing of a record.

24. Equipment as claimed in claim 23, and also comprising a "PLAY" actuator to initiate record playing, the control means comprising logic means responsive to said actuator so that record playing can be initiated by actuation of the actuator and selector means in either order.

25. Equipment as claimed in claim 24, wherein the control means comprises a store to store the occurrence of actuation of the actuator and the logic means are coupled to read said store.

26. Equipment as claimed in claim 23, wherein the control means comprises a store having a plurality of addresses defining respective operating steps of the equipment and test logic controlled by the store to determine the sequence in which the addresses are read.

27. Gramophone equipment comprising:
a turntable for supporting a record,
a movable tone arm for supporting a gramophone pick-up,
drive means for the turntable and for displacing the tone arm to convey a pick-up across the turntable and towards and away from the turntable, and
control means for controlling the drive means to select recorded tracks of a record in dependence upon the reflectivity of the record,
said control means comprising:
photoelectric scanning means carried by the tone arm for scanning such a record when on said turntable, and
timing means for delaying dropping of the tone arm when the band immediately preceding a selected track is sensed, the delay approximating an integral number of revolutions of the turntable less the time for said arm to drop.

28. Gramophone equipment comprising a turntable for supporting a phonograph record of the kind having recorded tracks with a relatively high groove density and bands with a relatively low groove density between, preceding and following said tracks, a movable tone arm for supporting a gramophone pick-up, drive means for the turntable and for displacing the tone arm to convey a pick-up across the turntable and towards and away from the turntable, and control means for controlling the drive means to select recorded tracks of a record in dependence upon the reflectivity of the record, the control means comprising: photoelectric scanning means carried by the tone arm for scanning such a record when on said turntable and comprising a source of light to illuminate the record and a photodetector to detect the light reflected from the record to produce a signal which varies in dependence upon the reflectivity of the scanned portions of the record; and a peak detection circuit for detecting peaks of the signal of the photodetector, the peak detection circuit comprising differentiating means for differentiating the signal and means for detecting passages through a predetermined value of the differentiated signal, thereby to provide signal portions indicative of respective ones of said bands; and means responsive to said signal portions for controlling the drive means.

29. Equipment as claimed in claim 28, wherein the control means comprises means for controlling the response of the scanning means in dependence upon the mean level of the signal produced by the scanning means.

30. Equipment as claimed in claim 28, wherein the photodetector is mounted within an elongate passage with the axis of the passage substantially at right angles to the surface of the turntable.

31. Equipment as claimed in claim 30, wherein the light emitting device has a focussing lens.

32. Gramophone equipment as claimed in claim 28 and comprising an electronic counter coupled to the peak detection circuit to count said signal portions; selector means manually operable to define a track selection; electronic memory means coupled to the selector means to store a track selection defined by the selector means; and control circuitry including comparator means coupled to the counter and memory means to compare the stored selection with the number, as stored in said counter, of said signal portions occurring during scanning of the gramophone record, and to produce a control signal for said drive means in dependence upon the comparison to cause the tone arm to move its pick-up onto the band immediately preceding a track defined by the stored track selection.

33. Equipment as claimed in claim 32, wherein the memory means comprises a plurality of storage locations coupled to the selector means to store a sequence of track selections as defined by the selector means, and said control means includes means for operating the drive means, under the control of the scanning means, to move the tone arm to produce the stored sequence of selections.

34. Equipment as claimed in claim 33, and comprising display means for displaying each selection when entered by the selector means and for also displaying each selection as it is played.

35. Equipment as claimed in claim 33, wherein the control means comprises a store having a plurality of addresses defining respective operating steps of the equipment and test logic controlled by the store to determine the sequence in which the addresses are read.

36. Equipment for controlling a gramophone tone arm comprising: a reversible motor; an angularly displaceable cam having a ramp portion coupled to be angularly displaced by the motor; a tone arm drive shaft mounted for angular displacement coaxially of the cam; a magnetic clutch incorporating an operating winding and which coaxially couples the cam and drive shaft; and a tone arm control member mounted for linear motion parallel to the axis of the cam to engage said ramp portion of said cam to cause lifting and lowering of the tone arm as said member rides up and down the ramp portion during angular displacement of the cam.

37. Equipment as claimed in claim 36, and comprising at least one light responsive element and light influencing means carried by the tone arm drive shaft to affect the passage of light to the responsive element in predetermined angular positions of the drive shaft.

38. Equipment as claimed in claim 37, wherein the light influencing means is adjustably positioned for adjusting said angular positions.

39. Equipment as claimed in claim 36, wherein there are switches controlled by the cam to define predetermined cam positions corresponding to the vertical position of the tone arm and predetermined angular limits for displacement of the cam.

40. Equipment as claimed in claim 36, and comprising a displaceable brake member frictionally coupled to the drive shaft, and the cam having a portion to displace and maintain the brake member out of its coupling with the drive shaft in an angular position of the cam in which the control member is in its lowermost position in relation to the cam.

41. Equipment as claimed in claim 40, wherein the cam is formed to commence to displace the brake member out of coupling with the drive shaft when the control member is on the ramp portion.

42. Equipment as claimed in claim 36, and comprising a member displaceable for the purpose of actuating a record changing mechanism and the cam having a portion to engage said member to cause its displacement when the cam is moving in a given direction at a given angular position at which the control member is in its raised position.

43. Equipment as claimed in claim 42, and comprising means for stopping the drive to the turntable during record changing.

44. Gramophone equipment comprising a turntable for supporting a gramophone record, a movable tone arm for supporting a gramophone pick-up, drive means for the turntable and for displacing the tone arm to convey a pick-up across the turntable and towards and away from the turntable, and control means for controlling the drive means to select recorded tracks of a record in dependence upon the reflectivity of the record, the control means comprising photoelectric scanning means carried by the tone arm for producing a signal which varies in dependence upon the reflectivity of the scanned portions of such a record; means for controlling the drive means in dependence upon said signal of the photoelectric scanning means; and timing means for introducing a time interval between the detection of a selected record track and the playing of the track, the time interval approximating an integral number of revolutions of the turntable less the time taken for said arm to drop, thereby to compensate for any eccentricity in the arrangement of recorded tracks on the record.

45. Equipment as claimed in claim 44, wherein the control means comprises analysing circuit means for analysing said signal portions to produce therefrom peak signals in response to peaks of the signal of the scanning means, the control means being arranged to utilize said peak signals as indicative of the bands.

46. Equipment as claimed in claim 44, wherein the scanning means are adjustably carried by the tone arm so as at any instant to scan a record portion adjustably in advance of the record engagement point.

47. Equipment as claimed in claim 44, and comprising a signal generator responsive to tone arm lateral position to provide a centre limit signal on sensing a tone arm position at a given radial distance from the axis of the turntable in a central region of the turntable, the control means having logic means responsive to the centre limit signal and a signal derived from the scanning means to operate the drive means to lift the tone arm away from a record when both the signal derived from the scanning means indicates one of said bands and the centre limit signal has occurred.

48. Equipment as claimed in claim 47, wherein the signal generator is responsive to tone arm lateral position to provide an edge signal defining when the tone arm has passed a position corresponding to the edge of a record of given size, the logic means being responsive to the edge signal to disable any signal portions occurring before the edge signal.

49. Equipment as claimed in claim 48, wherein the drive means comprises a reversible motor, a cam, having a ramp portion, coupled to be driven by the motor, a tone arm drive shaft, a releasable magnetic clutch for selectively coupling the cam and the drive shaft, and a tone arm control member mounted to engage said cam to cause lifting and lowering of the tone arm as said member rides up and down the ramp portion.

50. Equipment as claimed in claim 49, and comprising a displaceable brake member frictionally coupled to the drive shaft, and the cam having a portion to hold the brake member cut of its coupling with the drive shaft in an angular position of the cam in which the control member is in its lowermost position in relation to the cam.

51. Equipment as claimed in claim 49, wherein the signal generator comprises at least one light responsive element and a light influencing means carried by the tone arm drive shaft to affect the passage of light to the responsive element in predetermined angular positions of the drive shaft.

52. Equipment as claimed in claim 51, wherein there are switches controlled by the cam to define predetermined cam positions, the switches being included in the control means.

* * * * *